(12) United States Patent
Nakano

(10) Patent No.: US 7,468,721 B2
(45) Date of Patent: Dec. 23, 2008

(54) LIQUID CRYSTAL DISPLAY

(75) Inventor: Takao Nakano, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 532 days.

(21) Appl. No.: 10/418,286

(22) Filed: Apr. 18, 2003

(65) Prior Publication Data

US 2004/0095402 A1 May 20, 2004

(30) Foreign Application Priority Data

Nov. 20, 2002 (JP) ............................. 2002-337119

(51) Int. Cl.
- G09G 3/36 (2006.01)
- G09G 5/00 (2006.01)
- G09G 5/10 (2006.01)
- G09G 5/02 (2006.01)
- G06F 3/038 (2006.01)

(52) U.S. Cl. ..................... 345/102; 345/207; 345/690; 345/697

(58) Field of Classification Search ................... 345/87, 345/102, 103, 173, 175, 176, 204, 207, 690, 345/697

See application file for complete search history.

(56) References Cited

U.S. PATENT DOCUMENTS

| | | | |
|---|---|---|---|
| 5,153,756 A * | 10/1992 | Ike | 349/116 |
| 5,933,089 A * | 8/1999 | Katada | 340/7.55 |
| 6,188,380 B1 | 2/2001 | Kawashima et al. | |
| 6,621,476 B2 * | 9/2003 | Walton et al. | 345/87 |
| 7,068,333 B2 * | 6/2006 | Ohashi et al. | 349/68 |
| 2002/0030660 A1 * | 3/2002 | Arakawa | 345/102 |
| 2003/0043107 A1 * | 3/2003 | Ruby et al. | 345/102 |
| 2003/0156100 A1 * | 8/2003 | Gettemy | 345/204 |
| 2003/0210221 A1 * | 11/2003 | Aleksic | 345/102 |
| 2003/0231161 A1 * | 12/2003 | Yamaguchi | 345/102 |
| 2004/0104886 A1 * | 6/2004 | Kawano | 345/102 |

FOREIGN PATENT DOCUMENTS

| | | | | |
|---|---|---|---|---|
| JP | 55156481 A | * | 12/1980 | |
| JP | 03249622 A | * | 11/1991 | |
| JP | 10-96890 A | | 4/1998 | |
| JP | 10-222084 A | | 8/1998 | |
| JP | 2000124484 A | * | 4/2000 | |
| JP | 2000-131137 A | | 5/2000 | |
| JP | 2001-265296 A | | 9/2001 | |
| JP | 2003-337319 A | | 11/2003 | |

* cited by examiner

Primary Examiner—Amr Awad
Assistant Examiner—Alexander S. Beck
(74) Attorney, Agent, or Firm—Birch, Stewart, Kolasch & Birch, LLP

(57) ABSTRACT

The present invention provides a liquid crystal display capable of detecting external light by an optical sensor without providing a window in front of a product. A top face of a liquid crystal display panel (18) corresponds to a display surface. A light-guiding plate (19) is disposed on a rear face of the liquid crystal display panel (18). A backlight (9) shown in FIG. 1 is attached to the light-guiding plate (19). Light emitted from the backlight (9) is guided to the display surface of the liquid crystal display panel (18) by the light-guiding plate (19). A reflection sheet (20) is disposed on a bottom face of the light-guiding plate (19). An optical sensor (10) is attached to a side face of the light-guiding plate (19) with its light-receiving face facing the inside of the light-guiding plate (19).

20 Claims, 39 Drawing Sheets

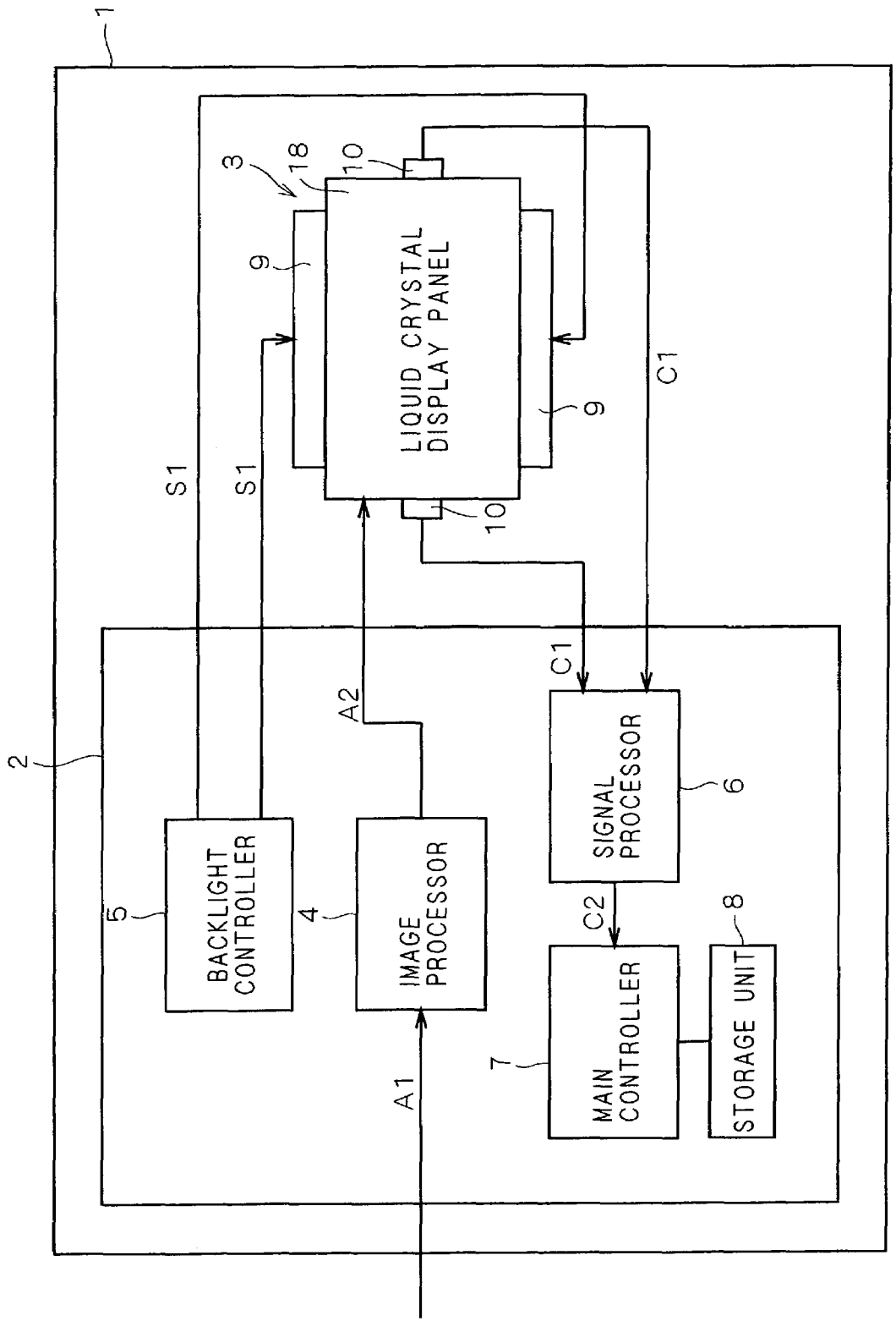
F I G . 1

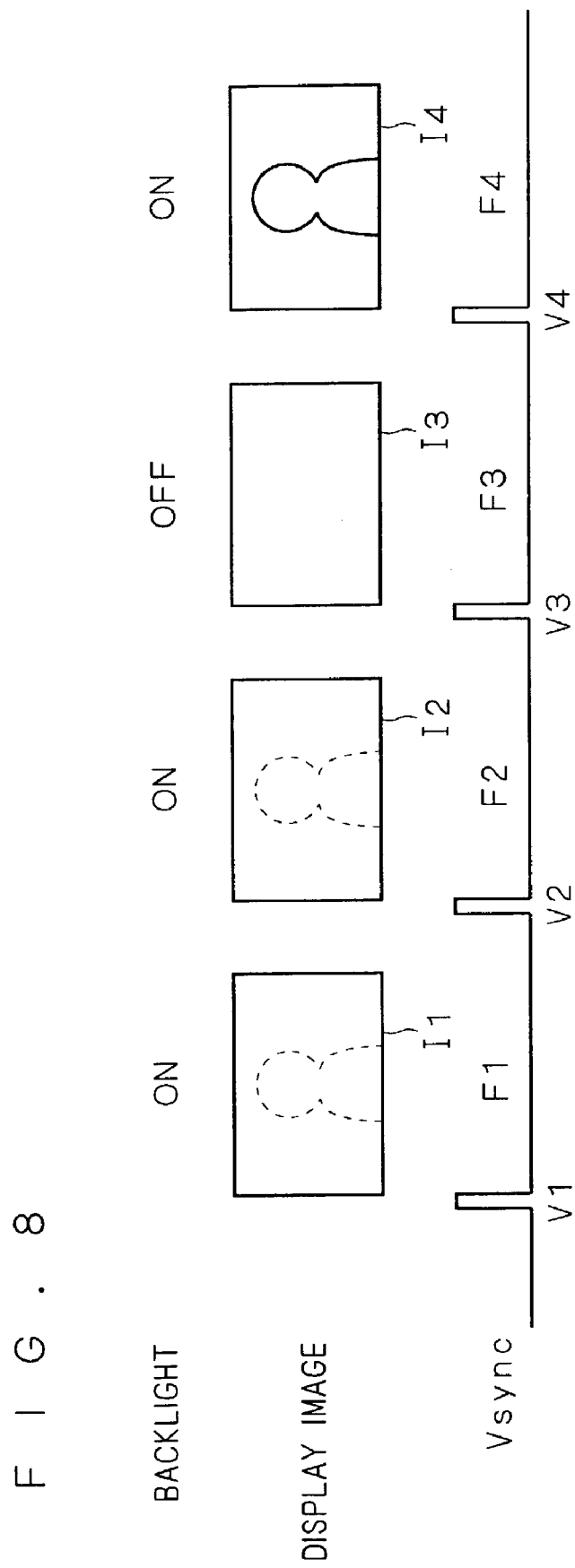

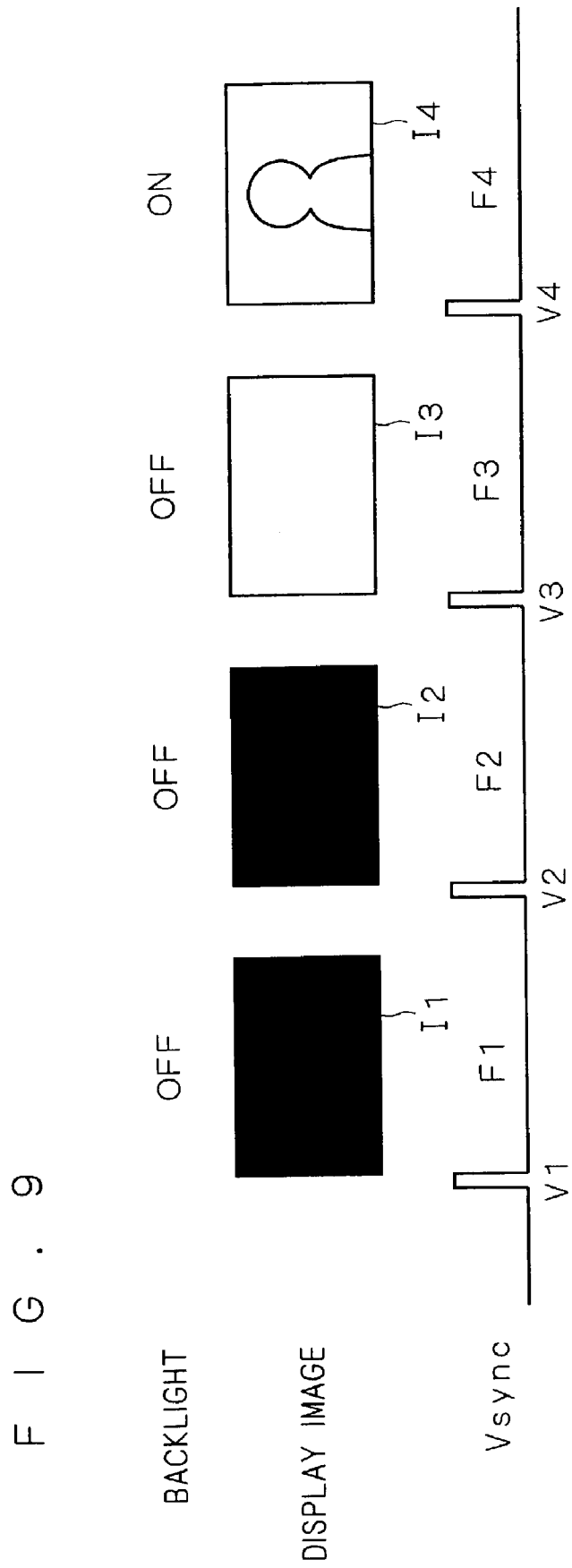

F I G . 1 1
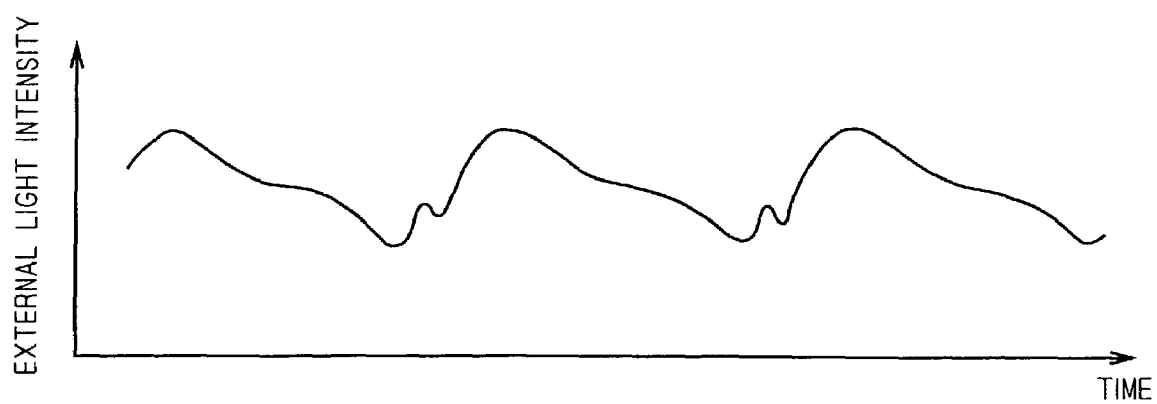

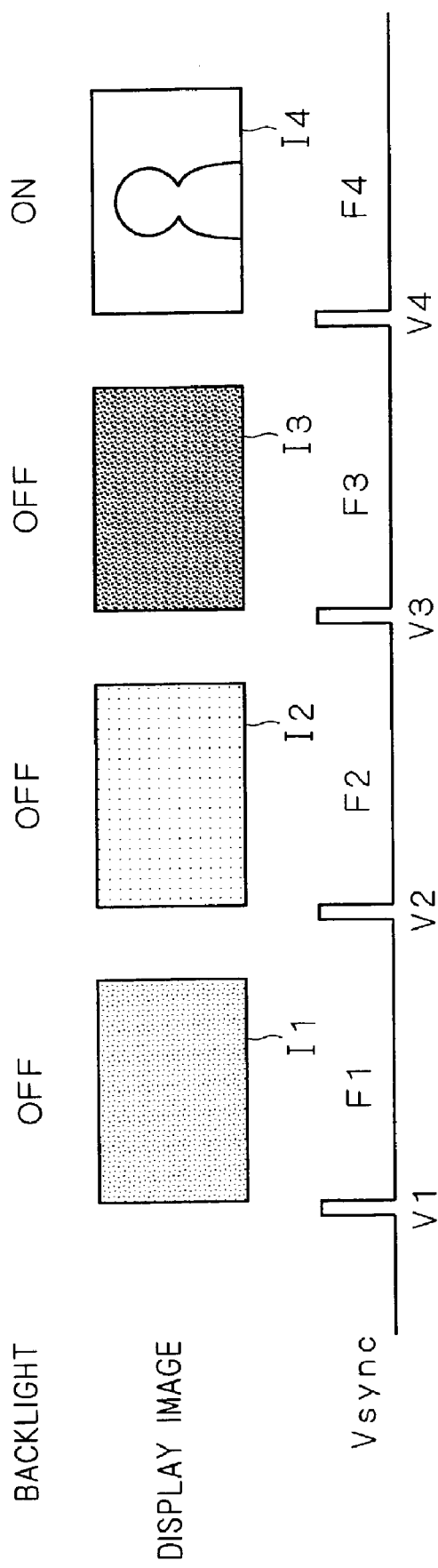

F I G . 2 3
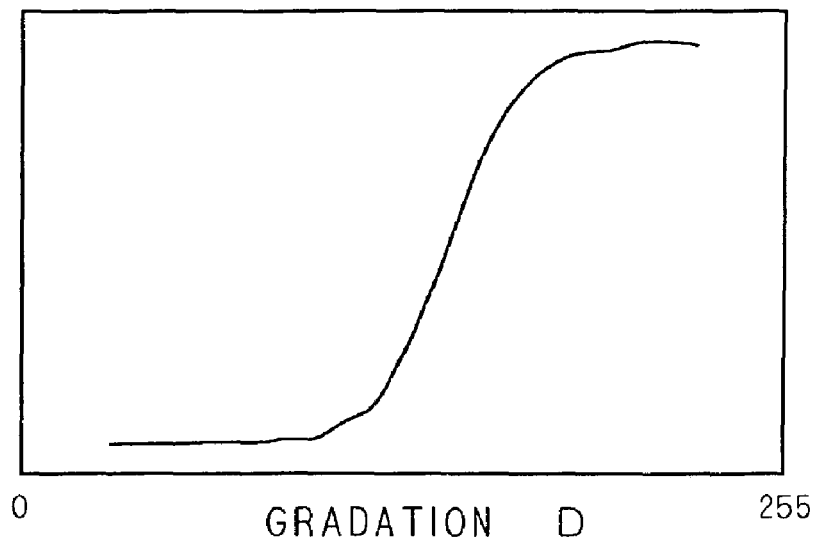
F I G . 2 4
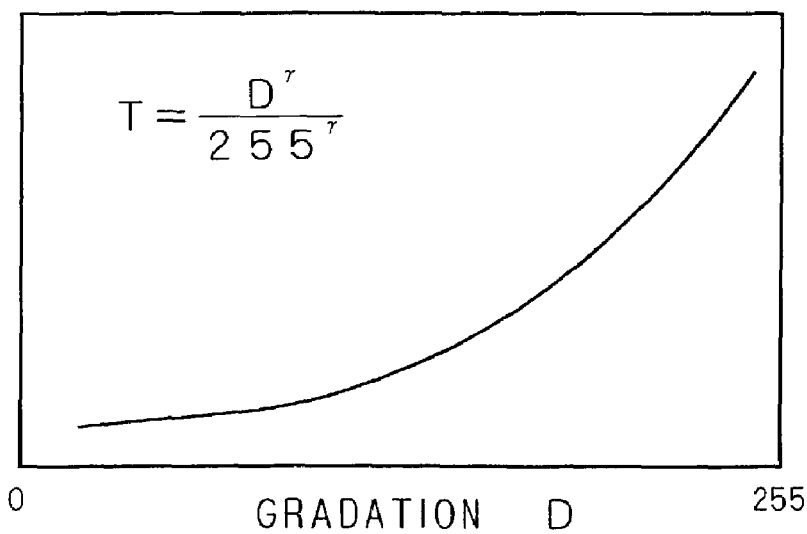

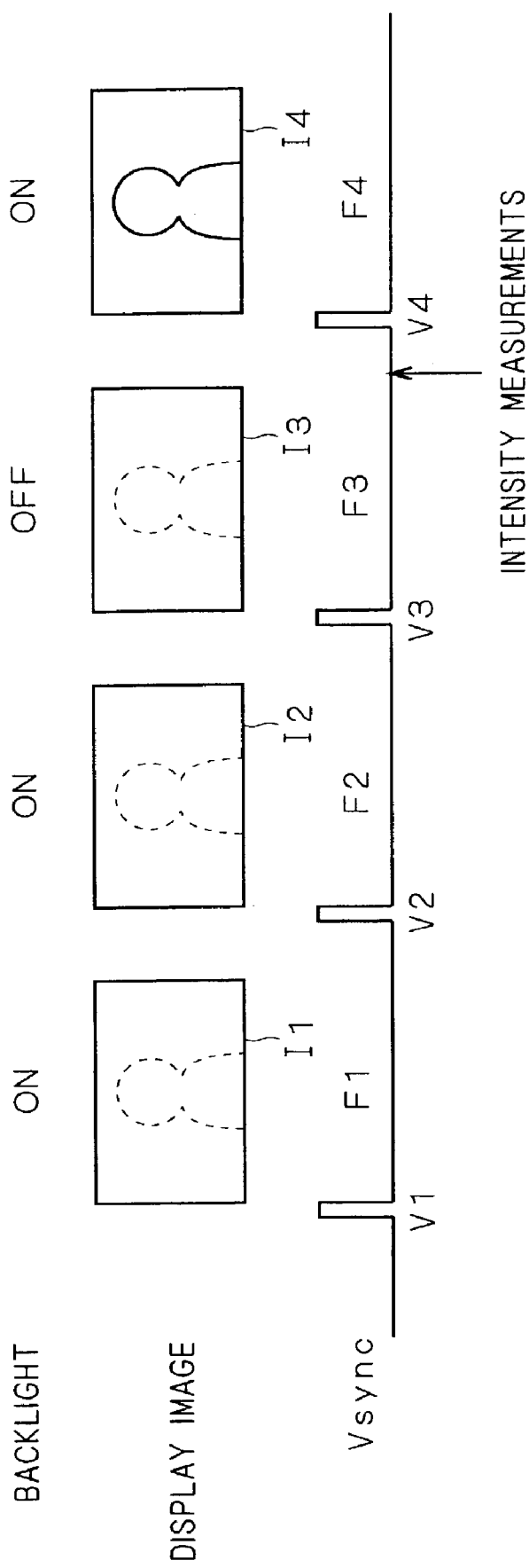

| $D_{11}$ | $D_{12}$ | $D_{13}$ | · · · · · · · · · · · · · · · · · · · | $D_{1n}$ |
|---|---|---|---|---|
| $D_{21}$ | $D_{22}$ | $D_{23}$ | | · |
| $D_{31}$ | | | | · |
| · | | | | · |
| $D_{m1}$ | · · · · · · · · · · · · · · · · · · · | | | $D_{mn}$ |

| $K_{11}$ | $K_{12}$ | $K_{13}$ | · · · · · · · · · · · · · · · · · · · | $K_{1n}$ |
|---|---|---|---|---|
| $K_{21}$ | $K_{22}$ | $K_{23}$ | | · |
| $K_{31}$ | | | | · |
| · | | | | · |
| $K_{m1}$ | · · · · · · · · · · · · · · · · · · · | | | $K_{mn}$ |

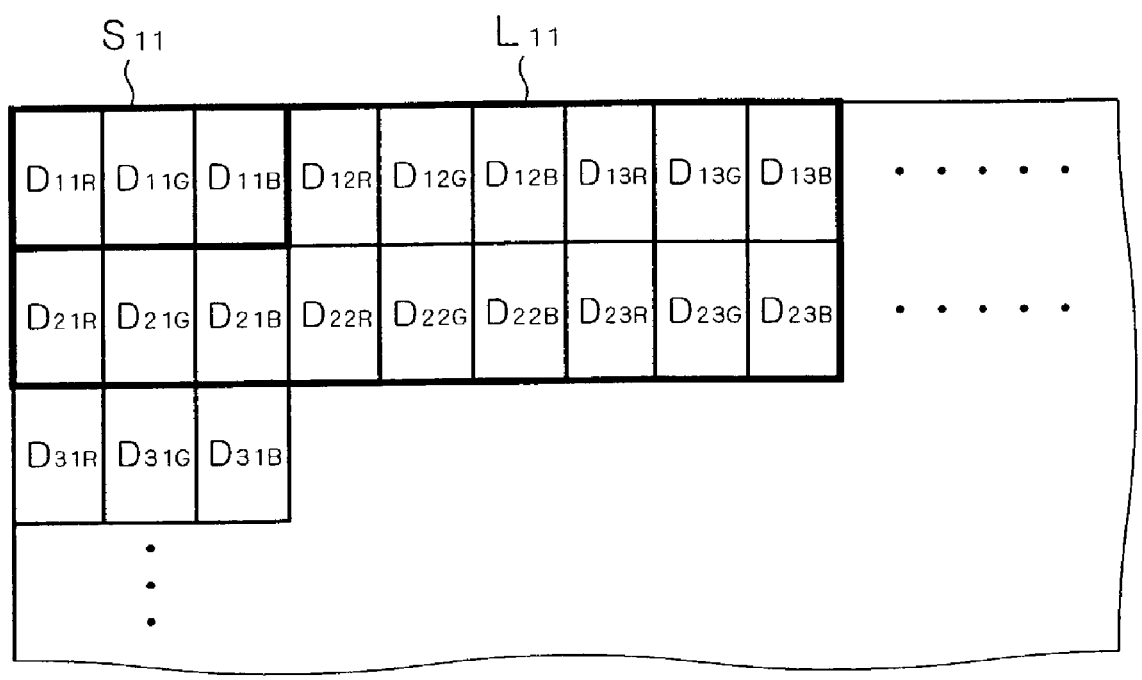
F I G . 3 2

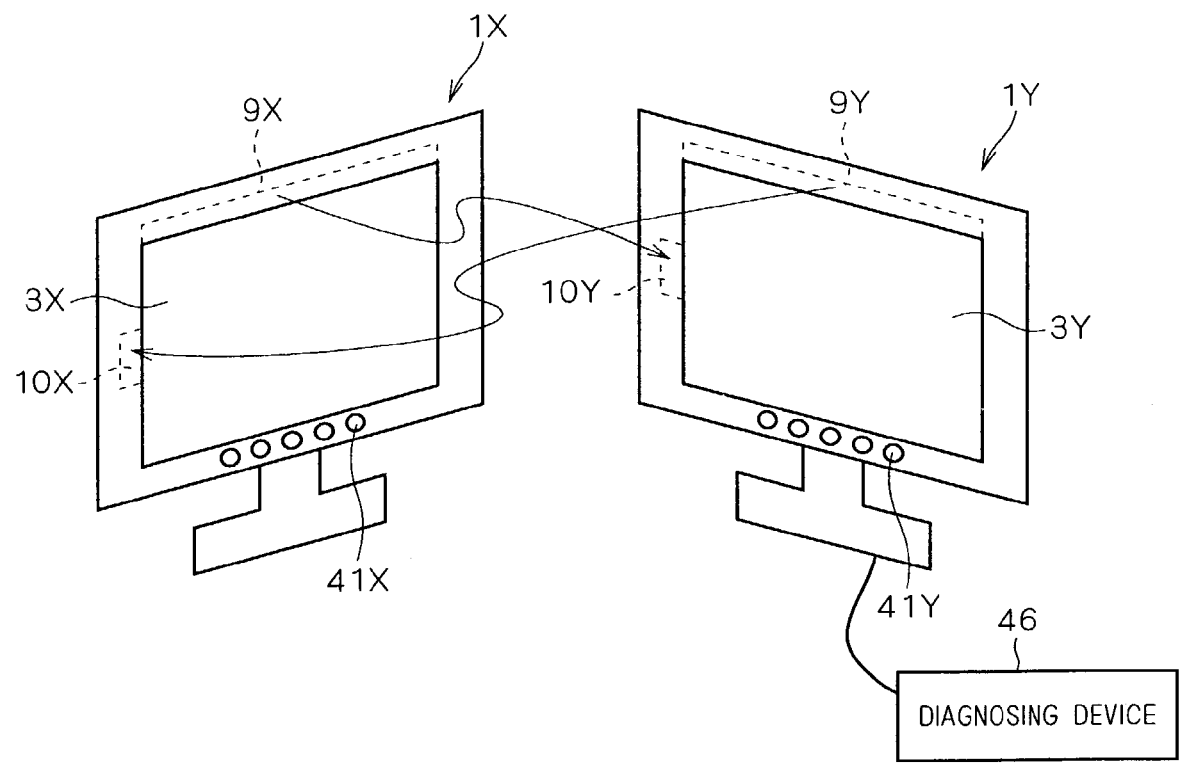
F I G . 4 4

LIQUID CRYSTAL DISPLAY

BACKGROUND OF THE INVENTION

1. Field of the Invention

The present invention relates to a liquid crystal display having an optical sensor and a backlight.

2. Description of the Background Art

In a conventional liquid crystal display, the light-emitting luminance of a backlight is switched depending on ambient brightness in a position at which the display is placed. In an attempt to achieve such control, an optical sensor is disposed inside a plastic cover with a window formed in the front face of the plastic cover. External light is allowed to reach the optical sensor from the outside of the device through the window, so that the optical sensor measures the intensity of the external light. Then, based on the results of measurements by the optical sensor, the light-emitting luminance of the backlight is switched (for example, see Japanese Patent Application Laid-Open No. 10-96890 (1998) (FIG. 1)).

However, in such a conventional liquid crystal display, since the window needs to be provided in the front face of the plastic cover, the resulting problems are in that an unnecessary area is required for forming the window, and in that an unnecessary limitation is imposed on the product design.

SUMMARY OF THE INVENTION

It is an object of the present invention to provide a liquid crystal display which can detect external light by using an optical sensor without providing a window in front of a product.

According to a first aspect of the present invention, the liquid crystal display includes a liquid crystal display panel having a display surface, an optical sensor placed on the rear face of the display surface, and a backlight for illuminating the display surface. In a first state where the light transmittance of liquid crystal becomes the greatest with a first image being displayed on the display surface, while the backlight has been turned off, the optical sensor detects light that has been directed from the outside of the panel through the display surface.

With this arrangement, since it is not necessary to place a light-receiving-use window on the front face of the product, it becomes possible to solve problems of an unnecessary area used for forming the window and a limitation imposed on the product design.

According to a second aspect of the present invention, the liquid crystal display includes a liquid crystal display panel having a display surface on which a plurality of pixels are arranged, an optical sensor placed on the rear face of the display surface, a backlight for illuminating the display surface and an operation unit for executing predetermined calculations. In a state where a desired image is displayed on the display surface with the backlight being turned off, the optical sensor detects the intensity of first external light that has been directed from the outside of the panel through the display surface. Based on gradation data of the desired image and the intensity of the first external light detected by the optical sensor, the operation unit calculates the intensity of second external light that would be directed from the outside of the panel through the display surface and detected by the optical sensor, on the assumption that an image which makes the light transmittance of liquid crystal greatest was displayed on the entire face of the display surface with the backlight being turned off. Based on the intensity of the second external light calculated by the operation unit, the luminance of the display surface is adjusted.

With this arrangement, it becomes possible to completely eliminate irregularities on the surface that might be sensed by the observer, which are caused upon displaying an all-white image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of a liquid crystal display according to a first embodiment of the present invention;

FIG. 8 is a schematic diagram for describing operations of the liquid crystal display according to the first embodiment of the present invention;

FIG. 9 is a schematic diagram for describing operations of a liquid crystal display according to a second embodiment of the present invention;

FIG. 11 is a graph showing the results of detection by an optical sensor;

FIG. 22 is a schematic diagram for describing operations of the liquid crystal display according to the ninth embodiment of the present invention, based on the second embodiment;

FIG. 23 is a graph showing the relationship between gradation and transmittance in the case where a gamma correction is not carried out;

FIG. 24 is a graph showing the relationship between gradation and transmittance in the case where a gamma correction is carried out;

FIG. 25 is a schematic diagram for describing operations of a liquid crystal display according to a tenth embodiment of the present invention;

FIG. 26 illustrates the gradation of each pixel when an image is displayed;

FIG. 27 illustrates the correction coefficient corresponding to each pixel;

FIG. 32 illustrates the gradation in each pixel in the case where a liquid crystal display panel has color filters of three colors;

FIG. 44 is a schematic diagram showing a state where communications are executed between a liquid crystal display according to a twentieth embodiment of the present invention and an external device;

DESCRIPTION OF THE PREFERRED EMBODIMENTS

First Embodiment

Figure 2:
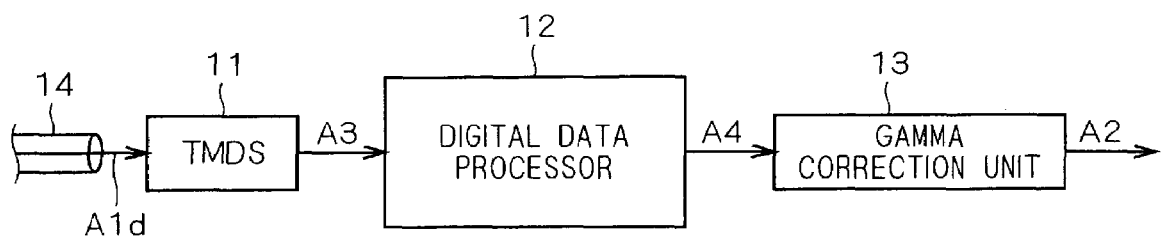
FIG. 2 is a block diagram showing a first configuration of an image processor.

FIG. 1 is a block diagram showing a configuration of a liquid crystal display according to a first embodiment of the present invention. The liquid crystal display 1 is provided with a panel unit 3 having a monochrome or color liquid crystal display panel 18 of a light-transmitting type, and a control substrate 2 that controls the panel unit 3. The control substrate 2 is provided with an image processor 4, a backlight controller 5, a signal processor 6, a main controller 7 and a storage unit 8. The main controller 7 is prepared as, for example, a microcomputer. The storage unit 8, which is, for example, a nonvolatile semiconductor memory, is connected to the main controller 7. The panel unit 3 has a pair of backlights 9 and a pair of optical sensors 10. However, the number of the backlights 9 and optical sensors 10 is not intended to be limited by these. The optical sensor 10 is an optical sensor having a response time of not more than 0.1 msec, which uses, for example, a pin photodiode or a phototransistor. The backlight 9 is prepared as a backlight that can be on/off-controlled in not less than 1 msec, that is, for example, a backlight using an LED (Light Emitting Diode) or an EL (Electro Luminescence).

FIG. 2 shows a block diagram that indicates a first structure of the image processor 4. The image processor 4 has a TMDS (Transition Minimized Differential Signaling), a digital data processor 12 and a gamma correction unit 13. Digital image data A1d is inputted to the TMDS 11 through a signal cable 14 from the outside of the liquid crystal display 1. Digital image data A3 is inputted to the digital data processor 12 from the TMDS 11. The digital data processor 12 carries out various data processes, such as an image-enlarging or -reducing process and a filtering process. Digital image data A4 is inputted to the gamma correction unit 13 from the digital data processor 12. The gamma correction unit 13 carries out the gamma correction process by using a look-up table. The gamma correction unit 13 outputs digital image data A2. The digital image data A2 is inputted to the panel unit 3, shown in FIG. 1.

Figure 3:
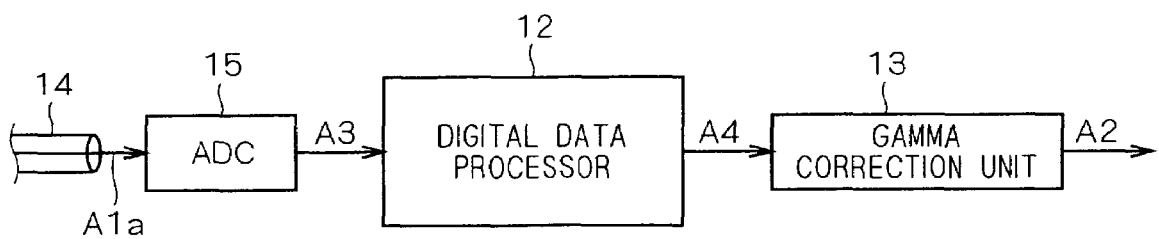
FIG. 3 is a block diagram showing a second configuration of the image processor.

FIG. 3 is a block diagram that shows a second structure of the image processor 4. An ADC (Analog Digital Converter) is installed therein in place of the TMSD 11 shown in FIG. 2. An analog image signal A1a is inputted to the ADC 15 from the outside of the liquid display device 1 through a signal cable 14. The ADC 15 converts the analog image signal A1a into digital image data A3. The digital image data A3 is inputted from the ADC 15 to the digital data processor 15.

Figure 4:
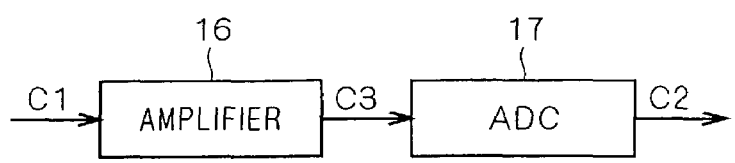
FIG. 4 is a block diagram showing a configuration of a signal processor.

FIG. 4 is a block diagram that shows a structure of the signal processor 6. The signal processor 6 has an amplifier 16 and an ADC 17. An analog signal C1 is inputted to the amplifier 16 from the optical sensor 10 shown in FIG. 1. The amplifier 16 amplifies the analog signal C1, and outputs the resulting signal as an analog signal C3. The analog signal C3 is inputted to the ADC 17 from the amplifier 16. The ADC 17 converts the analog signal C3 to digital data C2, and outputs the resulting signal. The digital data C2 is inputted to the main controller 7 shown in FIG. 1.

Figure 5A:
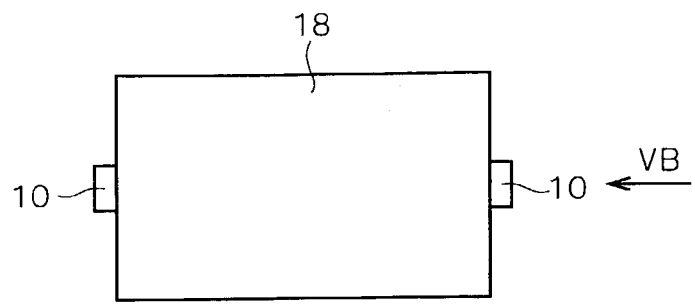
FIGS. 5A and 5B illustrate a first structure of a panel unit.
Figure 5B:
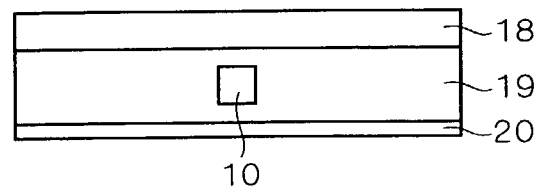

FIG. 5A is a top view that shows a first structure of the panel unit 3, and FIG. 5B is a side view that is obtained when the structure of FIG. 5A is seen from the direction shown by arrow VB. The liquid crystal display panel 18 is provided with a polarizing plate, a glass plate, liquid crystal, a diffusion plate, a lens sheet, etc. (none of these are shown in the figure). In FIG. 5B, the top face of the liquid crystal display panel 18 forms a display surface. A light-guiding plate 19 is placed on the rear face of the liquid crystal display panel 18. Although not shown in FIGS. 5A and 5B, the backlight 9 shown in FIG. 1 is attached to the light-guiding plate 19. Light emitted from the backlight 9 is guided to the display surface of the liquid crystal display panel 18 by the light-guiding plate 19. A reflection sheet 20 is placed on the bottom face of the light-guiding plate 19. The optical sensor 10 is attached to a side face of the light-guiding plate 19 with its light-receiving face (not shown) facing the inside of the light-guiding plate 19.

Figure 6A:
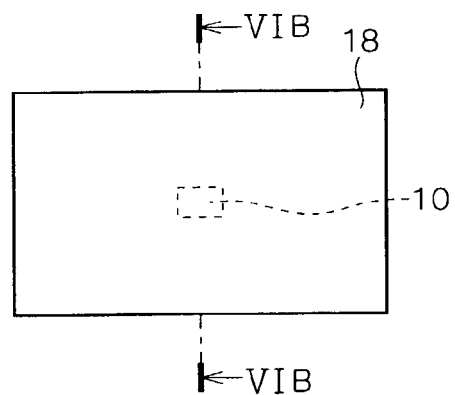
FIGS. 6A and 6B illustrate a second structure of the panel unit.
Figure 6B:
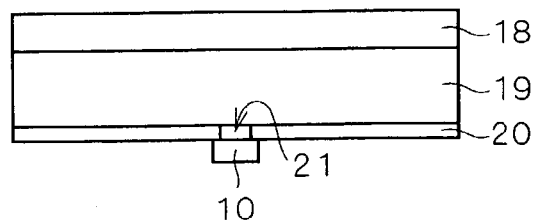

FIG. 6A shows a top view that indicates a second structure of the panel unit 3, and FIG. 6B is a side view that is obtained when the structure of FIG. 6A is seen from the direction shown by arrow VIB. The optical sensor 10 is attached to the bottom face of the light-guiding plate 19 through the reflection sheet 20, with its light-receiving face (not shown) facing the inside of the light-guiding plate 19. A small hole 21, which is used for guiding light to the optical sensor 10, is formed in the reflection sheet 20.

Figure 7A:
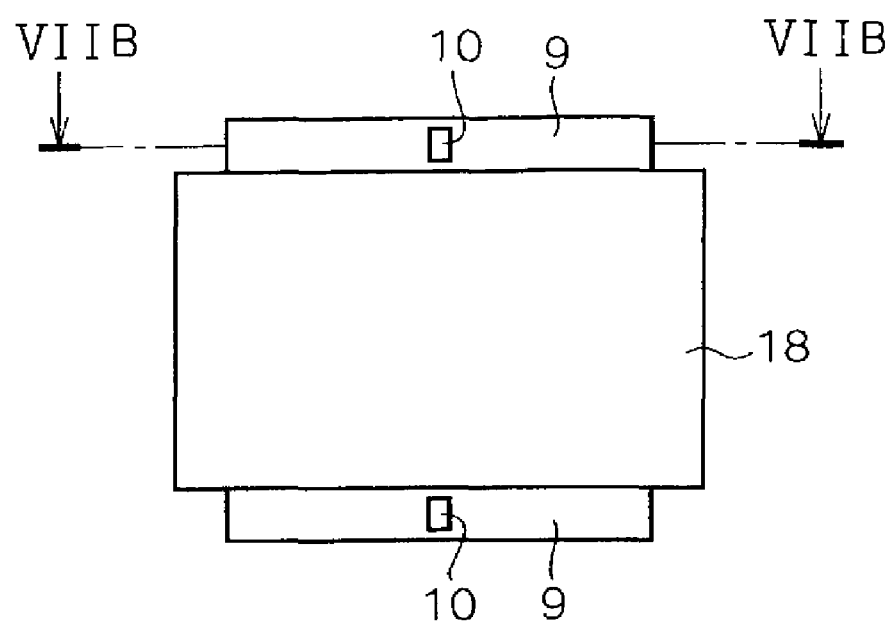
FIGS. 7A and 7B illustrate a third structure of the panel unit.
Figure 7B:
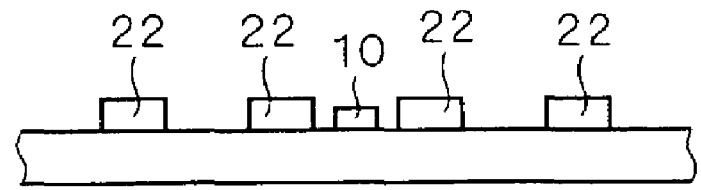

FIG. 7A shows a top view that indicates a third structure of the panel unit 3, and FIG. 7B is a side view that is obtained when the structure of FIG. 7A is seen from the direction shown by arrow VIIB. The backlight 9 is attached to a side face of the light-guiding plate 19 (not shown in FIGS. 7A and 7B), and provided with a plurality of light-emitting elements (in this example, LEDs 22). Each optical sensor 10 is placed between the adjacent LEDs 22. Different from the structure in which the rod-shaped backlight 9 is attached to a side face of the light-guiding plate 19, a flat backlight on which a plurality of LEDs 22 are placed in a scattered manner on a plane is attached to the rear face of the light-guiding plate 19. In this case also, each optical sensor 10 is placed between the adjacent LEDs 22.

The following description will discuss operations of the liquid crystal display 1 according to the first embodiment of the present invention. As shown in FIG. 1, digital image data A2 is inputted to the panel unit 3 from the image processor 4. In the panel unit 3, an image is displayed on the display surface of the liquid crystal display panel 18 based on the digital image data A2. Light emitted from the backlight 9 is guided to the display surface of the liquid crystal display panel 18 by each of the light-guiding plates 19 shown in FIGS. 5 to 7 so that the observer is allowed to view the image.

Here, there is a change in the feeling of the observer as to whether he or she thinks the screen is lighter or darker, depending on ambient brightness (more specifically, brightness on the periphery of the display surface) in a position at which the liquid crystal display panel 18 is placed. When the ambient brightness is high, the observer feels that the screen is relatively darker, and, in contrast, when the ambient brightness is low, the observer feels that the screen is relatively brighter. Therefore, it is possible to provide a screen that is easily observed by the observer by adjusting the luminance of the screen depending on the ambient brightness.

In order to achieve such controlling operations, the liquid crystal display according to the first embodiment has an arrangement in which: the optical sensor 10 detects the intensity of external light on the periphery of the display surface, and the main controller 7 adjusts the luminance of the display surface based on the results of the detection by the optical sensor 10.

FIG. 8 shows a schematic diagram that describes the operations of the liquid crystal display according to the first embodiment. Frame periods F1 to F4 are controlled by vertical synchronous signals V1 to V4. During the frame periods F1, F2, images I1, I2 are respectively displayed on the display surface in accordance with normal operations of the liquid crystal display 1. At this time, the backlight 9 is turned on.

In the frame period F3, the backlight controller 5, shown in FIG. 1, controls so that the backlight 9 is turned off. Moreover, based on the digital image data A3 inputted from the image processor 4 to the panel unit 3, an image I3, which makes the light transmittance of the liquid crystal greatest (hereinafter, referred to as "all-white image"), is displayed over the entire portion of the display surface. In this state, the optical sensor 10 detects the intensity of external light that is made incident on the liquid display panel 18 through the display surface from the outside of the panel. An analog signal C1, which is derived from the detection results of the optical sensor 10, is amplified and AD-converted by the signal processor 6 shown in FIG. 1, and inputted to the main controller 7 as digital data C2.

In a manufacturing process of the liquid crystal display 1, a predetermined reference value relating to ambient brightness is stored in the storage unit 8. The main controller 7 compares the value of digital data C2 with this reference value. When the value of the digital data C2 is greater than the reference value, the main controller 7 carries out processes for increasing the luminance of the screen. For example, it increases the light-emitting luminance of the backlight 9, or increases the gain or bias of the image processor 4 so as to increase the gradation value of the image. In contrast, when the value of the digital data C2 is smaller than the reference value, the main controller 7 carries out the processes opposite to the above-mentioned processes in order to decease the luminance of the screen.

In the frame period F4, the sequence returns to the normal operations of the liquid crystal display 1 so that an image I4 is displayed on the display surface. At this time, the backlight 9 is again turned on. As a result of the correction process at the frame period F3, an image I4 whose luminance has been appropriately adjusted is displayed.

The all-white image I3, which is inserted so as to adjust the luminance of the screen, is preferably displayed to such a degree of time and frequency that the observer of the display screen would not sense the displayed state of the all-white image I3. For example, the display time is set to 1 second divided by the frequency of the vertical synchronous signal Vsync (for example, ⅟₆₀ in the case of 60 Hz), and the frequency of the insertion is set to once in several tens seconds or not more than this frequency. With this arrangement, it is possible to avoid making the observer of the display surface sense any irregularities on the display surface which is caused by the insertion of the all-white image I3.

In accordance with the liquid crystal display according to the first embodiment, the optical sensor 10 is placed on the rear face side of the display surface. Further, in a state where the all-white image that makes the light transmittance of the liquid crystal greatest is displayed over the entire display surface with the backlight 10 being turned off, the optical sensor 10 detects the intensity of external light on the periphery of the display surface, which has been guided from the outside of the panel through the display surface. Based on the results of the detection by the optical sensor 10, the main controller 7 adjusts the luminance of the display surface. Therefore, different from conventional liquid crystal displays, the present invention eliminates the necessity of installing a light-receiving window on the front face of the product, thereby making it possible to solve the problems of the wasteful area for the window and the limitation imposed on the product design.

Second Embodiment

As shown in FIG. 8, in the first embodiment, the all-white image I3 to be used for adjusting the luminance of the screen is inserted between normal images I2 and I4 that are displayed in accordance with normal operations of the liquid crystal display 1. However, during a period in which no image is displayed on the display surface in normal operations of the liquid crystal display 1, such as a moment immediately after the application of power to the liquid crystal display 1 and a moment immediately after a switchover between input signals to the liquid crystal display 1, the all-white image I3 to be used for adjusting the luminance of the screen may be displayed.

FIG. 9 is a schematic diagram for describing operations of a liquid crystal display according to a second embodiment of the present invention. Frame periods F1 to F3 correspond to periods immediately after the application of power to the liquid crystal display 1, and in these periods, the backlight 9 is turned off, in accordance with normal operations in the liquid crystal display 1. Moreover, in the frame periods F1, F2, images I1, I2 that make the light transmittance of the liquid crystal smallest (hereinafter, referred to as "all-black image") are displayed on the display surface, in accordance with normal operations of the liquid crystal display 1.

In the frame period F3, the all-white image I3 is displayed on the entire face of the display surface. Then, in the same manner as the first embodiment, the intensity of external light is detected by the optical sensor 10, and based on the results of the detection, the luminance of the screen is adjusted. In the frame period F4, the backlight 9 is turned on in accordance with normal operations of the liquid crystal display 1, with the image I4 being displayed on the display surface.

In this manner, in accordance with the liquid crystal display according to the second embodiment, the all-white image I3 to be used for adjusting the luminance of the screen is displayed within the period in which normal images are not displayed on the display surface in normal operations of the liquid crystal display 1. Therefore, since the all-white image I3 is displayed during the period in which no image is inherently displayed, it is possible to display the all-white image I3 without causing any problems.

Moreover, the all-white image I3 is displayed during a period in which the backlight 10 is turned off in normal operations of the liquid crystal display 1. Therefore, different from the first embodiment, since the turning-on and -off operations of the backlight 10 are not repeated during a short period of time, it is possible to reduce the possibility of making the observer of the display surface sense any irregularities on the display surface due to switching between the turning-on and -off operations of the backlight 10.

Moreover, the second embodiment makes it possible to display the all-white image I3 continuously over a plurality of frame periods without making the observer of the display surface sense any irregularities on the display surface. For example, as shown in FIG. 9, it is possible to display the all-white image I3 not only for the frame period F3, but also for the frame periods F1 and F2. The backlight 9 is turned off inherently during the frame periods F1 to F3; therefore, even when the all-white image I3 is continuously displayed over the frame periods F1 to F3, the observer of the display surface does not sense any irregularities on the display surface. Since the optical sensor 10 is allowed to detect the intensity of external light during a plurality of continuous frame periods, it is possible to improve the precision of the detection.

Third Embodiment

Figure 10:
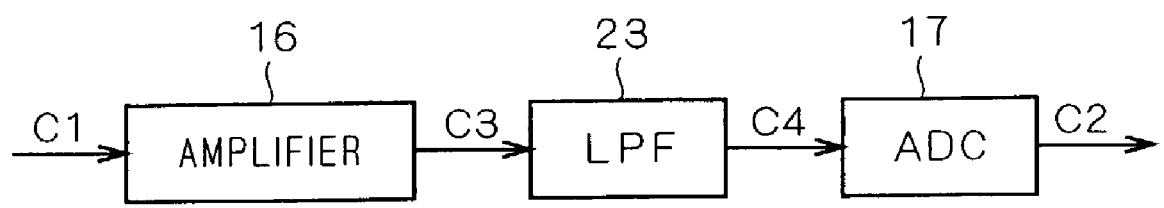
FIG. 10 is a block diagram showing a configuration of a signal processor according to a third embodiment of the present invention.

FIG. 10 shows a block diagram showing the configuration of a signal processor 6 according to a third embodiment of the present invention. The signal processor 6 is provided with an amplifier 16, a low-pass filter (LPF) 23 and an ADC 17. An analog signal C3 is inputted to the LPF 23 from the amplifier 16. An analog signal C4 is inputted to the ADC 17 from the LPF 23. The ADC 17 converts the analog signal C4 to digital data C2, and outputs the resulting signal.

FIG. 11 shows a graph that indicates the results of detection by the optical sensor 10. In the case where external light to be detected by the optical sensor 10 is light from a fluorescent lamp or the like, as shown in FIG. 11, the detected value of the intensity of external light by the optical sensor 10 is allowed to vary in synchronism with voltage variations in a commercial power supply.

As shown in FIG. 10, the results of detection by the optical sensor 10 are amplified by the amplifier 16, and after the variations caused by the commercial power supply have been removed by the LPF 23 shown in FIG. 10, the resulting signal is sent to the ADC 17.

Figure 12:
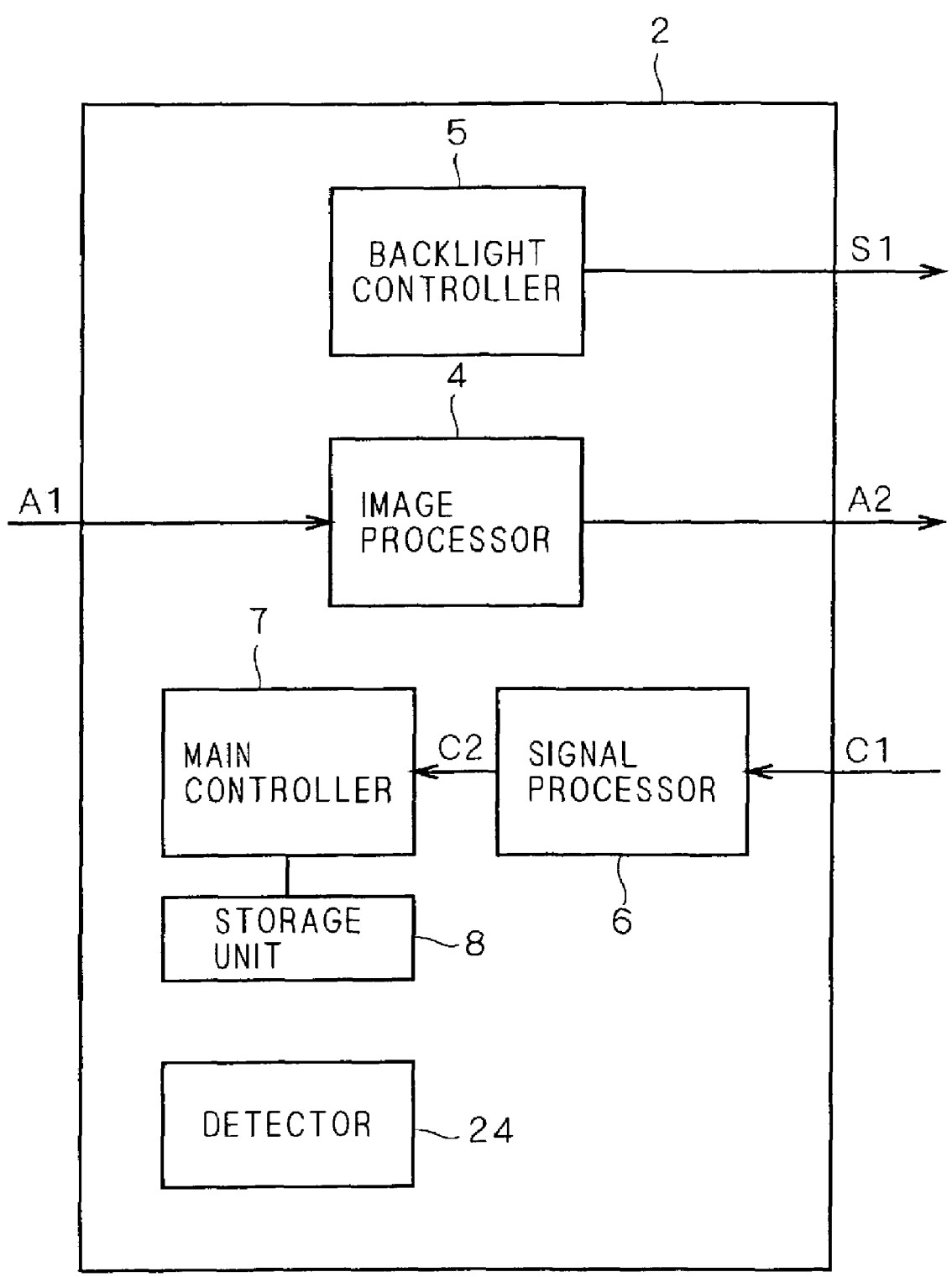
FIG. 12 is a block diagram showing a structure of a control substrate.

Alternatively, instead of the application of the LPF 23, the following controlling processes may be carried out. FIG. 12 shows a block diagram that indicates the structure of a control substrate 2 according to the third embodiment. The control substrate 2 is further provided with a detector 24 for detecting the frequency and the phase of the commercial power supply.

Figure 13:
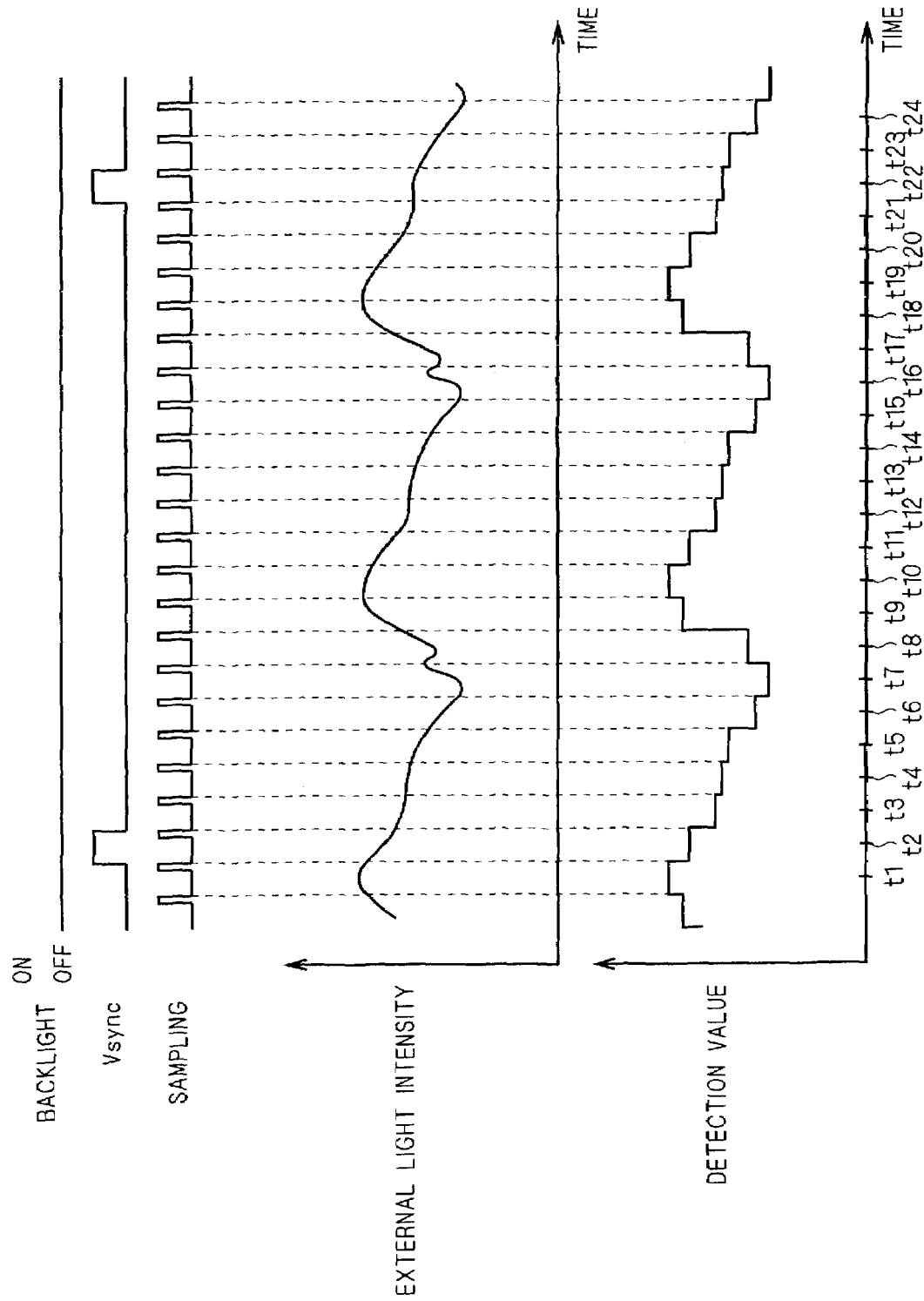
FIG. 13 is a diagram for describing a detection method for the frequency and phase of a commercial power supply by a detector.

FIG. 13 describes a detection method of the frequency and phase of the commercial power supply by the detector 24. During a period in which no image is displayed on the display surface in normal operations of the liquid crystal display 1, such as a moment immediately after the application of power to the liquid crystal display 1 and a moment immediately after a switchover between input signals to the liquid crystal display 1, the optical sensor 10 is allowed to detect the intensity of external light over a plurality of continuous frame periods. The sampling frequency to be used for detecting the intensity of external light is set to not less than 10 times the vertical synchronous signal Vsync. The results of the detection by the optical sensor 10 (graph on the lowermost stage of FIG. 13) are sent to the detector 24 shown in FIG. 12, and based on these, the frequency and phase of the commercial power supply are detected.

Thereafter, in the case where the adjustment processes of the screen luminance are carried out in the same manner as the first and second embodiments, based on the results of detection by the detector 24, the optical sensor 10 detects the intensity of external light in synchronized timing with the greatest intensity of external light. Alternatively, the optical sensor 10 may detect the intensity of external light continuously, and based on the results of detection by the detector 24, the main controller 7 may acquire digital data C2 from the signal processor 6 in synchronized timing so as to make the intensity of the external light greatest.

In this manner, in accordance with the liquid crystal display according to the third embodiment, even when the detected value of the intensity of external light by the optical sensor 10 is varied in synchronism with voltage variations in the commercial power supply, the detected value of the intensity of external light is appropriately obtained in synchronized timing with the greatest intensity of the external light. As a result, it is possible to appropriately execute adjustments on the screen luminance in accordance with ambient brightness.

Fourth Embodiment

In the third embodiment, the frequency and phase of the commercial power supply are detected by the detector 24, and based on the results of detection by the detector 24, the optical sensor 10 is allowed to detect the intensity of external light in synchronized timing with the greatest intensity of external light. However, as time elapses, or for any reasons, there may be an error between the timing in which the optical sensor 10 detects the intensity of external light and the timing in which the intensity of the external light actually becomes greatest. The fourth embodiment will discuss a liquid crystal display which can correct this error.

Figure 14:
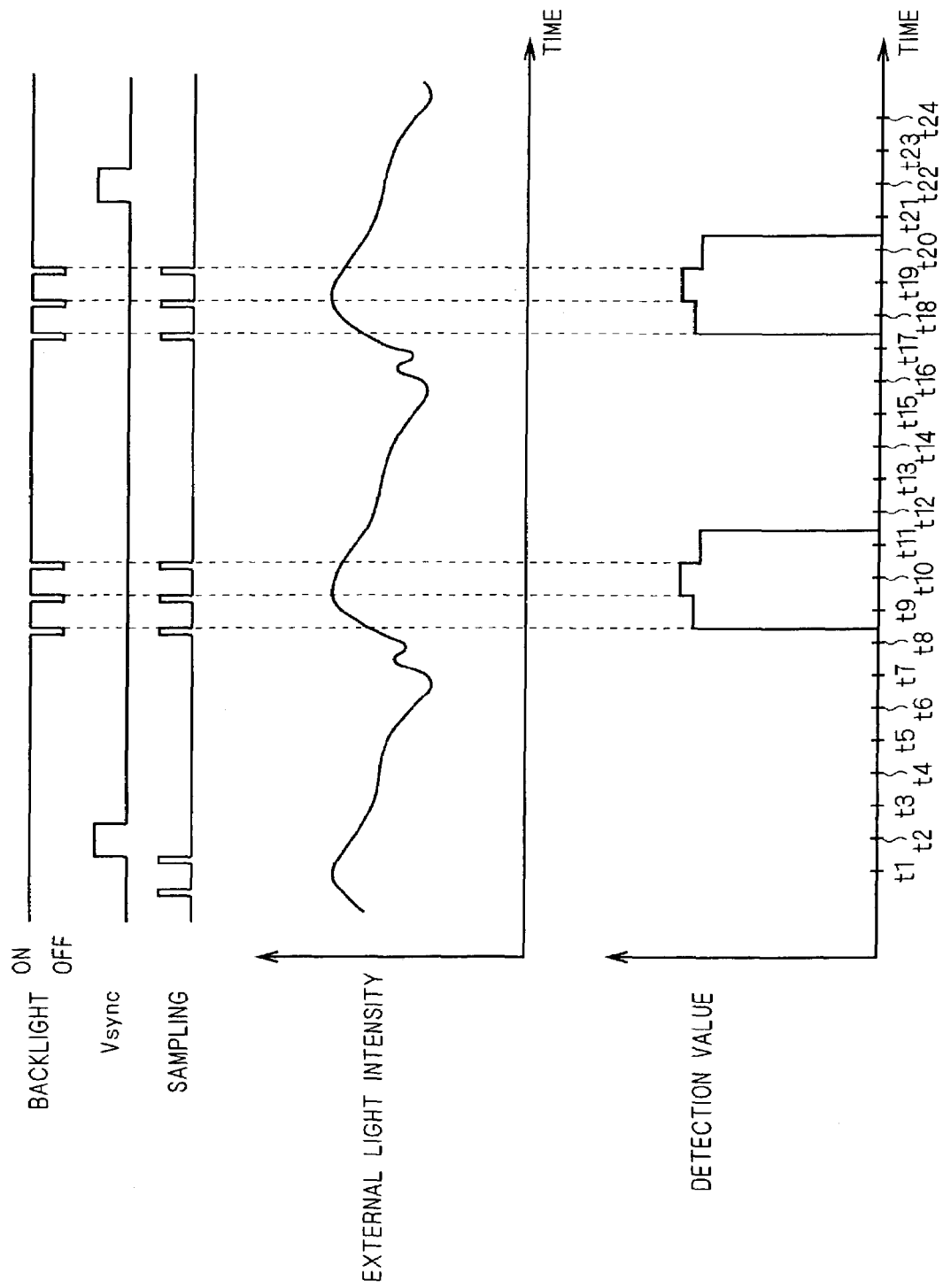
FIG. 14 is a diagram for describing operations of a liquid crystal display according to a fourth embodiment of the present invention.

FIG. 14 is a diagram for describing operations of a liquid crystal display according to a fourth embodiment of the present invention. During a frame period in which a normal image is displayed on the display surface in accordance with normal operations in the liquid crystal display 1, based on the results of detection by the detector 24, the optical sensor 10 detects the intensity of external light in synchronized timing (time t10, t19) in which the intensity of the external light is expected to become the greatest as well as in synchronized timing (time t9, time 11 with respect to time t10, and time t18, time t20 with respect to time t19) before and after the above-mentioned timing. In the moment at which the optical sensor 10 detects the intensity of external light, the backlight 9 is turned off. As described in the first embodiment, since the backlight 9 is constituted by LEDs or ELs, it is possible to carry out such an instantaneous turning-off controlling operation. The results of detection by the optical sensor 10 (graph shown on the lowermost stage of FIG. 14) are sent to the detector 24, and the detector 24 confirms whether or not the above-mentioned error is occurring. For example, in the case where the detection value at time t10 is greater than the detection values at time t9, t11, the detector 24 makes a determination that no error occurs. In the case where any error is occurring, the detector 24 again carries out the detection as shown in FIG. 13 or the like so as to correct the error.

Here, the above-mentioned process for confirming whether or not any error is occurring need not be executed in all the frame periods, and can be executed every predetermined number of frame periods.

In this manner, in accordance with the liquid crystal display according to the fourth embodiment, even in the case where there is an error between the timing at which the optical sensor 10 detects the intensity of external light and the timing at which the intensity of external light actually becomes greatest, the detector 24 continues to detect the frequency and the phase of the commercial power supply regularly so that it becomes possible to find the error and also to correct the error.

Fifth Embodiment

A liquid crystal display capable of detecting degradation in the performances of the back light 9 will be described in a fifth embodiment.

Figure 15:
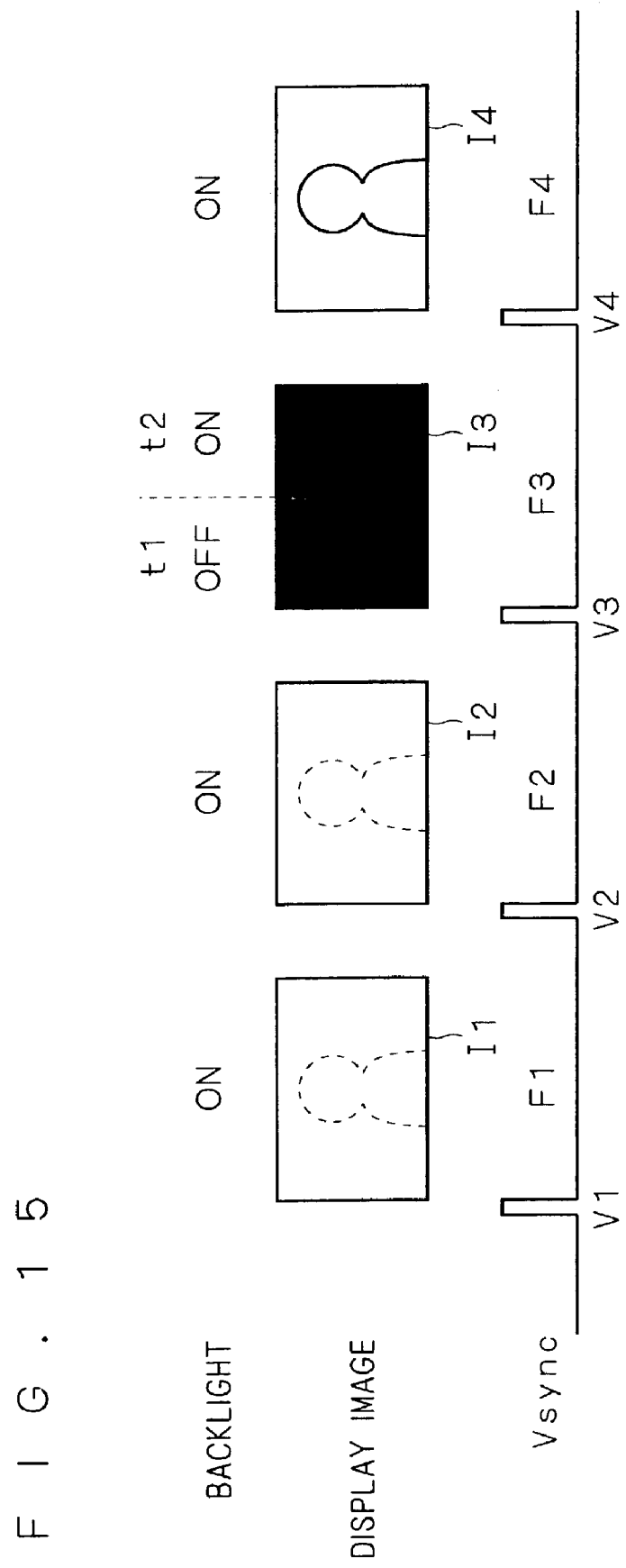
FIG. 15 is a schematic diagram for describing operations of a liquid crystal display according to a fifth embodiment of the present invention.

FIG. 15 shows a schematic diagram that describes operations of the liquid crystal display according to the fifth embodiment of the present invention. In frame periods F1, F2, images I1, I2 are respectively displayed on the display surface in accordance with normal operations of the liquid crystal display 1. At this time, the backlight 9 is turned on.

In the frame period F3, based on digital image data A3 inputted to the panel unit 3 from the image processor 4, an all-black image I3 is displayed over the entire face of the display surface. Moreover, in the former half of the frame period F3, the back light 9 is turned off by the backlight controller 5. In this state, the optical sensor 10 is allowed to detect the intensity of external light leaking from the display surface. The result of detection by the optical sensor 10 (referred to as "first detection value" in the fifth embodiment") is inputted to the main controller 7 through the signal processor 6.

In the latter half of the frame period F3, the backlight 9 is again turned on by the backlight controller 5. In this state, the optical sensor 10 is allowed to detect the sum of the intensities of external light leaking from the display surface and light emitted from the backlight 9. In the same manner, the result of detection by the optical sensor 10 (referred to as "second detection value" in the fifth embodiment") is inputted to the main controller 7 through the signal processor 6.

By subtracting the first detection value from the second detection value, the main controller 7 obtains the actual measured intensity of light emitted from the backlight 9, from which the influences of the leaking external light from the display surface have been removed.

Here, in the case where it has already been known that the intensity of light emitted from the backlight 9 is sufficiently greater than the intensity of external light leaking from the display surface, it is possible to carry out only the detection in the latter half of the frame period F3.

In a manufacturing process of the liquid crystal display 1, a predetermined reference value relating to the intensity of light emitted from the backlight 9 is stored in the storage unit 8. The main controller 7 compares the above-mentioned actual measured intensity with this reference value so that the variations in light-emitting luminance of the backlight 9 and the time-based deterioration of the light source, caused by the temperature and humidity, are determined. In the case of a reduction in the light-emitting luminance of the backlight 9, the main controller 7 sends a correction instruction to the backlight controller 5 so as to increase the light-emitting luminance of the backlight 9.

In the frame period F4, the sequence returns to normal operations of the liquid crystal display 1 so that an image I4 is displayed on the display surface. At this time, the backlight 9 is turned on. As a result of the correction processes in the frame period F3, an image I4 whose luminance has been appropriately adjusted is displayed.

The all-black image I3, which is inserted so as to adjust the light-emitting luminance of the backlight 9, is preferably displayed to such a degree of time and frequency that the observer of the display screen would not sense the displayed state of the all-black image I3. For example, the display time is set to 1 divided by the frequency of the vertical synchronous signal Vsync (for example, 1/60 in the case of 60 Hz) second, and the frequency of the insertion is set to once in several tens seconds or not more than this frequency. With this arrangement, it is possible to avoid making the observer sense any irregularities on the surface due to insertion of the all-black image I3.

In this manner, in accordance with the liquid crystal display according to the fifth embodiment, by using the actual measured intensity of light emitted from the backlight 9, from which influences of external light leaking from the display surface have been eliminated, it becomes possible to measure the change in light-emitting luminance of the backlight 9 and the degradation in the backlight 9 with high precision.

Moreover, by applying the fifth embodiment to each of the first to fourth embodiments, it is possible to execute adjustments on the screen luminance with high precision in accordance with ambient brightness.

Sixth Embodiment

In the fifth embodiment, the correction processes of the light-emitting luminance of the backlight 9 have been described on the assumption that a mono-color (normally, white) backlight 9 is adopted. In a sixth embodiment, correction processes of the light-emitting luminance will be described on the assumption that backlights 9R, 9G, 9B of the respective three colors of red (R), green (G) and blue (B) have been adopted.

Figure 16:
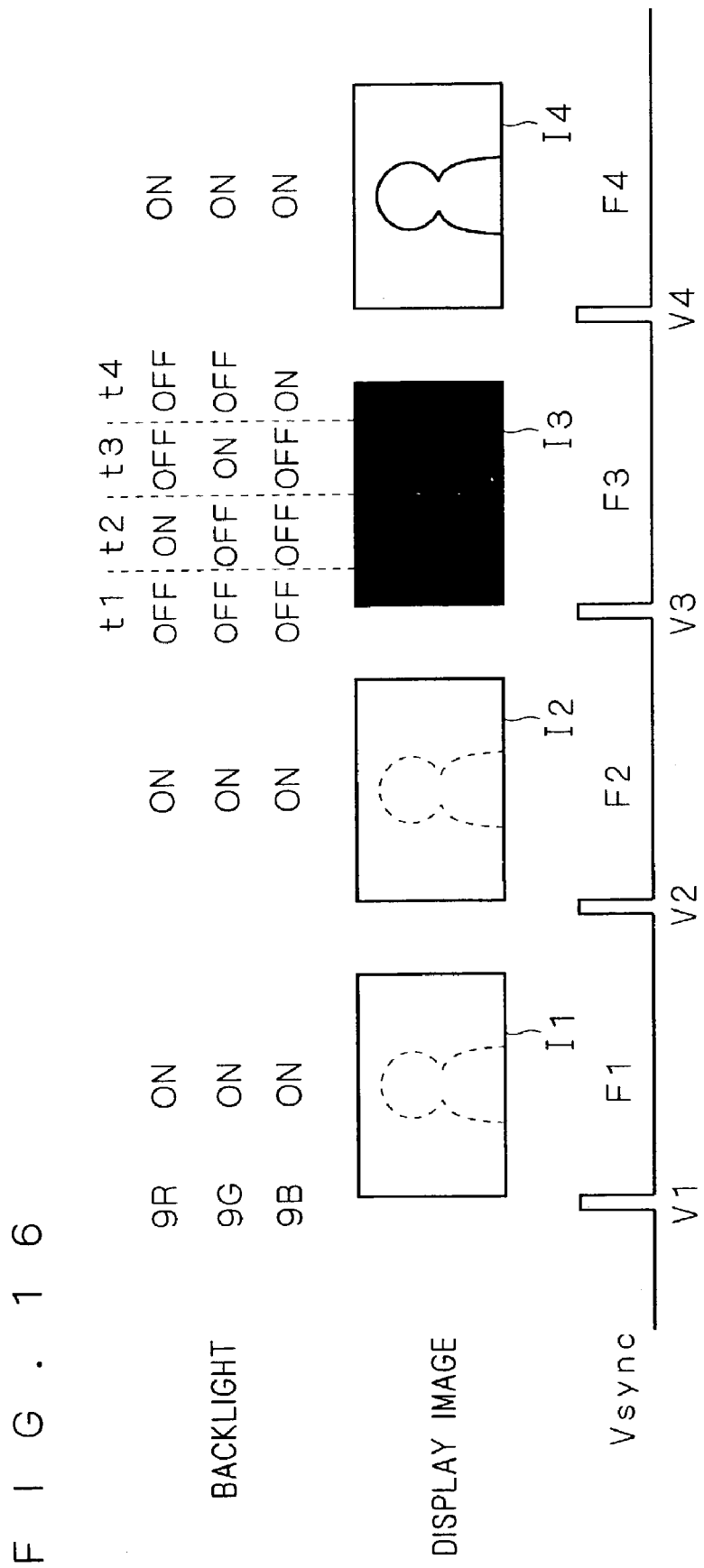
FIG. 16 is a schematic diagram for describing operations of a liquid crystal display according to a sixth embodiment of the present invention.

FIG. 16 is a schematic diagram that describes operations of a liquid crystal display according to the sixth embodiment of the present invention. In frame periods F, F2, images I1, I2 are respectively displayed on the display surface. At this time, all the backlights 9R, 9G, 9B are turned on.

In the frame period F3, the all-black image I3 is displayed over the entire face of the display surface. Moreover, in the first ¼-th period in the frame period F3, all the backlights 9R, 9G, 9B are turned off. In this state, the optical sensor 10 is allowed to detect the intensity of external light leaking from the display surface. The results of detection by the optical sensor 10 (referred to as "first detection value" in the sixth embodiment) are inputted to the main controller 7 through the signal processor 6.

In the next ¼-th period in the frame period F3, only the backlight 9R is again turned on. In this state, the optical sensor 10 is allowed to detect the sum of the intensities of external light leaking from the display surface and light emitted from the backlight 9R. At this time, the result of detection by the optical sensor 10 (referred to as "second detection value" in the sixth embodiment) is inputted to the main controller 7 through the signal processor 6.

In the next ¼-th period in the frame period F3, the backlight 9R is again turned off, and only the backlight 9G is again turned on. In this state, the optical sensor 10 is allowed to detect the sum of the intensities of external light leaking from the display surface and light emitted from the backlight 9G. At this time, the result of detection by the optical sensor 10 (referred to as "third detection value" in the sixth embodiment) is inputted to the main controller 7 through the signal processor 6.

In the last ¼-th period in the frame period F3, the backlight 9G is again turned off, and only the backlight 9B is again turned on. In this state, the optical sensor 10 is allowed to detect the sum of the intensities of external light leaking from the display surface and light emitted from the backlight 9B. At this time, the result of detection by the optical sensor 10 (referred to as "fourth detection value" in the sixth embodiment) is inputted to the main controller 7 through the signal processor 6.

In the main controller 7, by respectively subtracting the first detection value from each of the second to fourth detection values, the actual measured intensity of light, emitted from each of the backlights 9R, 9G, 9B, from which the influences of external light leaking from the display surface have been removed, can be obtained.

Here, in the case where it has already been known that the intensity of light emitted from each of the backlights 9R, 9G, 9B is sufficiently greater than the intensity of external light leaking from the display surface, it is not necessary to carry out the detection in the first ¼-th period of the frame period F3.

In a manufacturing process of the liquid crystal display 1, a predetermined reference value relating to the intensity of light emitted from each of the backlights 9R, 9G, 9B is stored in the storage unit 8. The main controller 7 compares the above-mentioned actual measured intensity with this reference value for each of the colors so that the variations in light-emitting luminance of each of the backlights 9R, 9G, 9B and the deterioration of each of the backlights 9R, 9G, 9B are determined.

In the frame period F4, the sequence returns to normal operations of the liquid crystal display 1 so that an image I4 is displayed on the display surface. At this time, all the backlights 9R, 9G, 9B are turned on. As a result of the correction processes in the frame period F3, an image I4 whose luminance has been appropriately adjusted is displayed.

In this manner, in accordance with the liquid crystal display of the sixth embodiment, by using the actual measured intensity of light emitted from each of the backlights 9R, 9G, 9B, from which influences of external light leaking from the display surface have been eliminated, it becomes possible to measure the change in light-emitting luminance of each of the backlights 9R, 9G, 9B and the degradation in each of the backlights 9R, 9G, 9B with high precision. As a result, it is possible to obtain data used for correcting drifts in chromaticity that occur due to temperature changes, with high precision.

Moreover, by applying the sixth embodiment to each of the first to fourth embodiments, it is possible to execute adjustments on the screen luminance with high precision in accordance with ambient brightness.

Seventh Embodiment

As shown in FIGS. 15 and 16, in the fifth and sixth embodiments, the all-black image I3 to be used for correcting the light-emitting luminance of each of the backlights 9, 9R, 9G, 9B is inserted between normal images I2 and I4 that are displayed in accordance with normal operations of the liquid crystal display 1. However, in the case where the all-black image is displayed on the display surface in normal operations of the liquid crystal display 1, such as a moment immediately after the application of power to the liquid crystal display 1 and a moment immediately after a switchover between input signals to the liquid crystal display 1, the all-white image may be utilized to carry out the correcting processes of the light-emitting luminance of each of the backlights 9, 9R, 9G, 9B.

Figure 17:
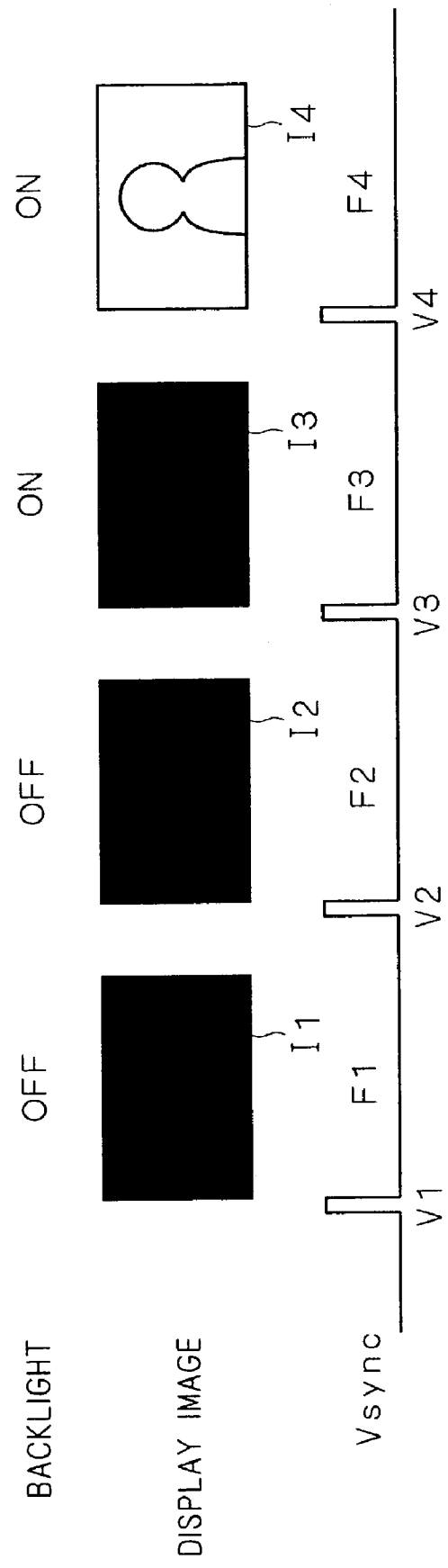
FIG. 17 is a schematic diagram for describing operations of a liquid crystal display according to a seventh embodiment of the present invention, on the assumption that a mono-color backlight is adopted.

FIG. 17 is a schematic diagram for describing operations of a liquid crystal display according to a seventh embodiment of the present invention, on the assumption that a mono-color backlight 9 is adopted. The frame periods F1 to F3 correspond to periods immediately after the application of power to the liquid crystal display 1. In the frame periods F1, F2, the backlight 9 is turned off, in accordance with normal operations in the liquid crystal display 1. Moreover, in the frame periods F1 to F3, the all-black images I1 to I3 are displayed on the entire face of the display surface, in accordance with normal operations of the liquid crystal display 1. In either or both of the frame periods F1 and F2, the optical sensor 10 detects the intensity of external light leaking from the display surface. In the frame period F3, the backlight 9 is turned on, and the optical sensor 10 is allowed to detect the sum of the intensities of the external light leaking from the display surface and the light emitted from the backlight 9. Based on the respective results of detection by the optical sensor 10 in the frame periods F2, F3, the main controller 7 obtains the actual measured intensity of the light emitted from the backlight 9, from which the influences of external light leaking from the display surface have been eliminated, in the same manner as the fifth embodiment.

Figure 18:
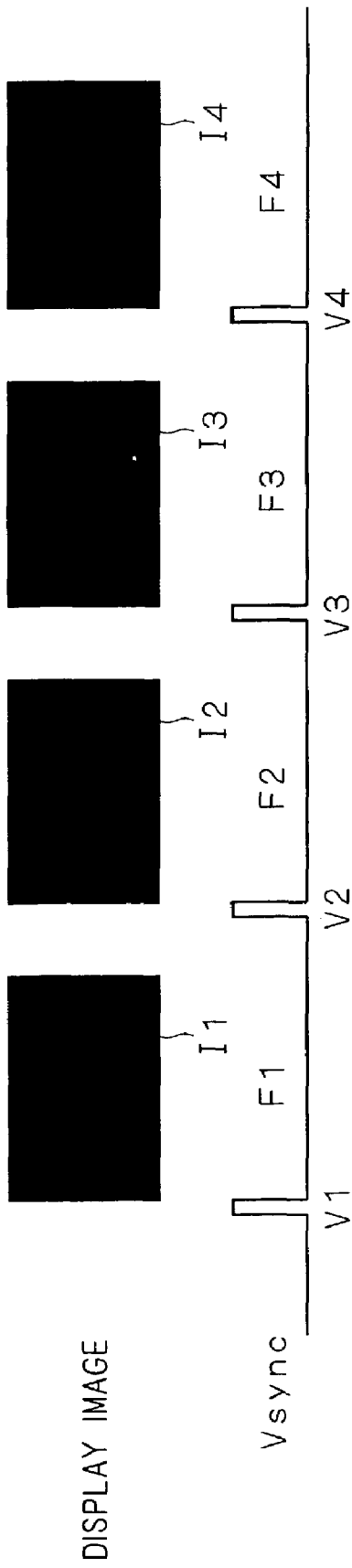
FIG. 18 is a schematic diagram for describing operations of the liquid crystal display according to the seventh embodiment of the present invention, on the assumption that backlights of three colors are adopted.

FIG. 18 is a schematic diagram that describes operations of a liquid crystal display according to the seventh embodiment of the present invention on the assumption that backlights 9R, 9G, 9B of three colors have been adopted. The frame periods F1 to F4 correspond to periods immediately after the application of power to the liquid crystal display 1. In the frame periods F1 to F4, the all-black images I1 to I4 are displayed on the entire face of the display surface, in accordance with normal operations of the liquid crystal display 1. In the frame period F1, all the backlights 9R, 9G, 9B are turned off in accordance with normal operations of the liquid crystal display 1. In the frame period F1, the optical sensor 10 is allowed to detect the intensity of external light leaking from the display surface.

In the frame period F2, only the backlight 9R is turned on. In this state, the optical sensor 10 is allowed to detect the sum of the intensities of the external light leaking from the display surface and the light emitted from the backlight 9R. In the frame period F3, only the backlight 9G is turned on. In this state, the optical sensor 10 is allowed to detect the sum of the intensities of the external light leaking from the display surface and the light emitted from the backlight 9G. In the frame period F, only the backlight 9B is turned on. In this state, the optical sensor 10 is allowed to detect the sum of the intensities of the external light leaking from the display surface and the light emitted from the backlight 9B.

Based on the respective results of detection by the optical sensor 10 in the frame periods F1 to F4, the main controller 7 obtains the actual measured intensity of the light emitted from each of the backlights 9R, 9G, 9B, from which the influences of external light leaking from the display surface have been eliminated, in the same manner as the sixth embodiment.

In this manner, in accordance with the liquid crystal display according to the seventh embodiment, in the case where all-black images are displayed on the display surface in normal operations in the liquid crystal display 1, by using these all black images, it becomes possible to carry out correcting processes of light-emitting luminance of each of the backlights 9, 9R, 9G, 9B. Therefore, since during periods in which all-black images are to be inherently displayed, all-black images used for carrying out correction processes on the light-emitting luminance are displayed, it becomes possible to display all-black images used for carrying out correction processes on the light-emitting luminance without making the observer of the display surface sense any irregularities on the display surface.

Moreover, the optical sensor 10 may detect the intensity of external light leaking from the display surface and the intensity of light emitted from each of the backlights 9, 9R, 9G, 9B for a plurality of continuous frame periods. Thus, it becomes possible to improve the precision of the detection by the optical sensor 10.

Eighth Embodiment

Figure 19:
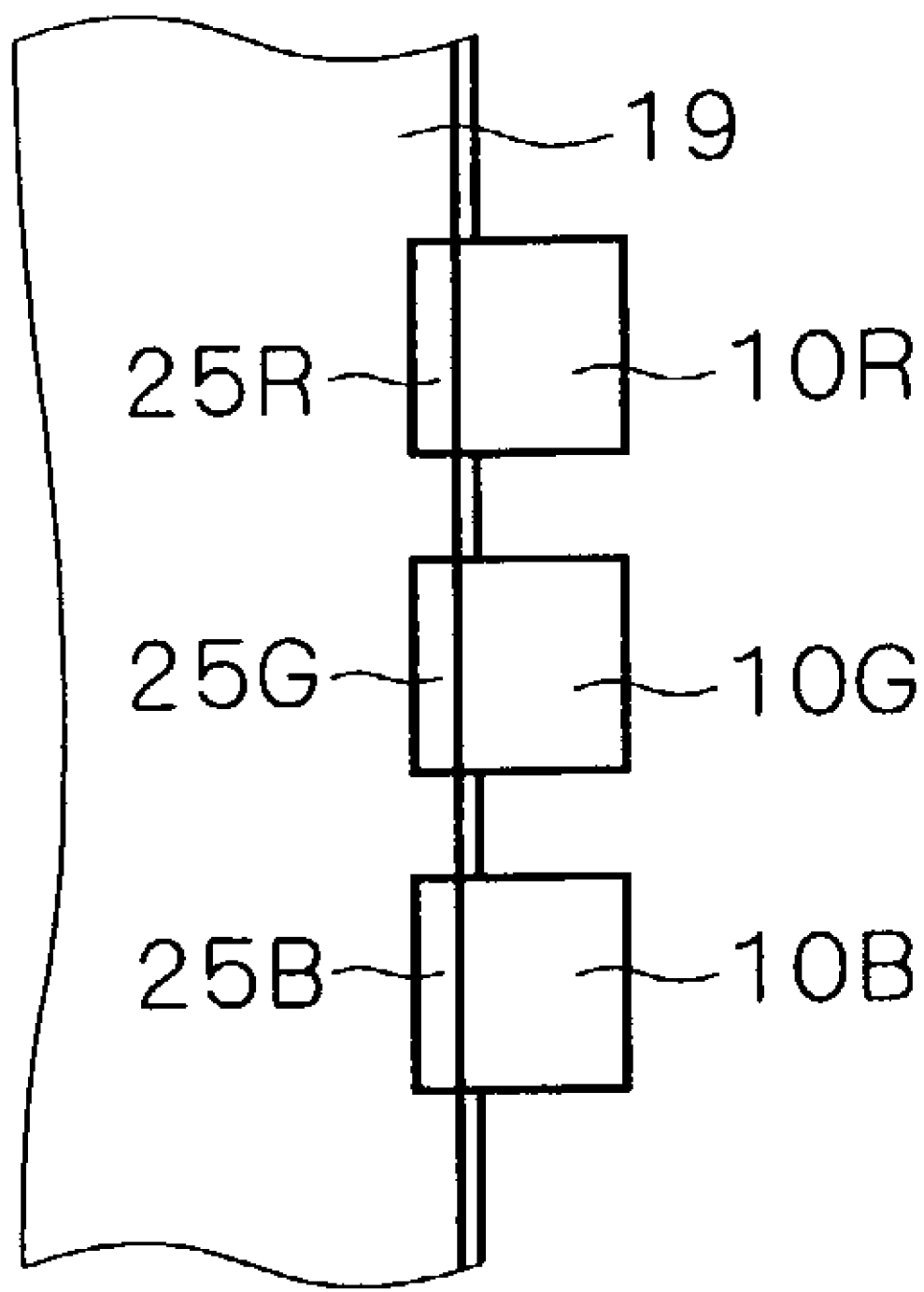
FIG. 19 is a top view showing a configuration of an optical sensor according to an eighth embodiment of the present invention.
Figure 20:
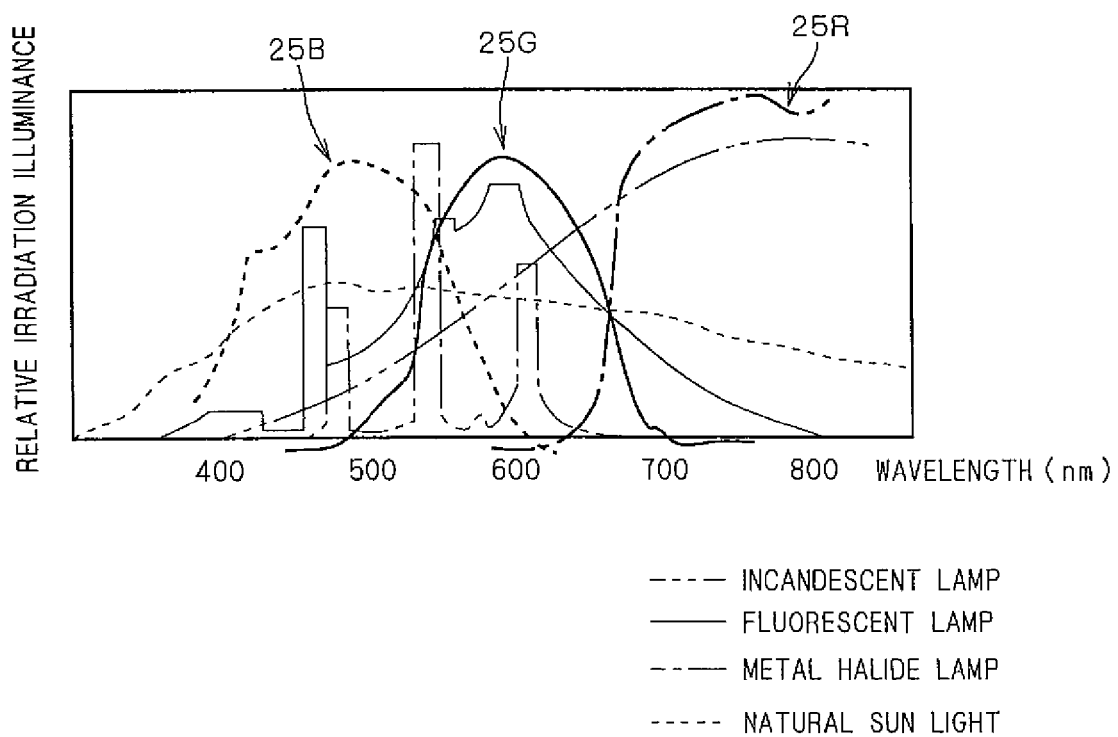
FIG. 20 is a graph showing a range of light wavelengths transmitted by a filter.

FIG. 19 is a top view showing the configuration of an optical sensor according to an eighth embodiment of the present invention. The liquid crystal display of the eighth embodiment, which is modified based on the liquid crystal display of the first to seventh embodiments, is provided with a plurality of optical sensors 10R, 10G, 10B which have mutually different ranges of light wavelengths that can be detected, in place of the optical sensor 10. Here, only one set of the optical sensors 10R, 10G, 10B may be installed, or a plurality of sets thereof may be installed. Filters 25R, 25G, 25B are respectively attached to the respective light-receiving faces of the optical sensors 10R, 10G, 10B. FIG. 20 shows graphs that respectively show ranges of light wavelengths that are respectively transmitted through the filters 25R, 25G, 25B. Since the filters 25R, 25G, 25B are respectively attached to the light-receiving faces, the optical sensor 10R is allowed to detect only the light having wavelengths corresponding to red and colors on the periphery thereof, the optical sensor 10G is allowed to detect only the light having wavelengths corresponding to green and colors on the periphery thereof, and the optical sensor 10B is allowed to detect only the light having wavelengths corresponding to blue and colors on the periphery thereof.

The optical sensors 10R, 10G, 10B, related to the eighth embodiment, can be used as optical sensors that are utilized for adjusting the screen luminance in accordance with ambient brightness. By using these, it becomes possible to detect the intensity of external light for each of the colors. As a result, as shown in FIG. 20, it becomes possible to determine the types of external light such as incandescent lamps and white fluorescent lamps, and consequently to adjust hues of the displayed image optimally in accordance with the types of external light.

Moreover, the optical sensors 10R, 10G, 10B according to the eighth embodiment may be used as optical sensors that are utilized for correcting the light-emitting luminance of the backlight in the fifth to seventh embodiments. Thus, it becomes possible to correct deviations in the balance of the light-emitting luminance of each of the colors of red, green and blue in the backlights 9, 9R, 9G, 9B.

Ninth Embodiment

A liquid crystal display according to a ninth embodiment, which is modified based on the liquid crystal display according to the first to fourth embodiments, is provided with color filters of three colors of red, green and blue, which have mutually different ranges of the wavelength of light to be transmitted, and also provided with the optical sensors 10R, 10G, 10B according to the eighth embodiment.

Figure 21:
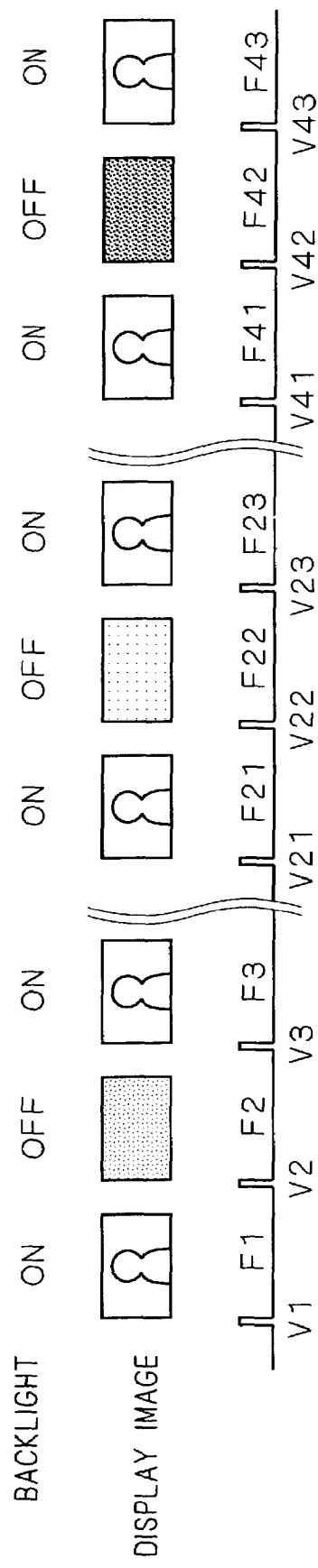
FIG. 21 is a schematic diagram for describing operations of a liquid crystal display according to a ninth embodiment of the present invention, based on the first embodiment.

FIG. 21 shows a schematic diagram that describes operations of a liquid crystal display according to the ninth embodiment based on the first embodiment. During a frame period F1, a normal image I1 is displayed on the display surface in accordance with normal operations of the liquid crystal display 1. At this time, the backlight 9 is turned on. During a frame period F2, the backlight 9 is turned off, and a red image is displayed over the entire face of the display surface. In this state, the optical sensor 10R is allowed to detect the intensity of external light having wavelengths corresponding to red color, which is guided into the liquid crystal display panel 18 from the outside of the panel through the display surface. The results of detection by the optical sensor 10R (referred to as "first results of detection" in the ninth embodiment) are inputted to the main controller 7 through the signal processor 6. During a frame period F3, the sequence returns to normal operations of the liquid crystal display 1, and the backlight 9 is again turned on.

During a frame period F22 after a lapse of several tens of frame periods, the backlight 9 is turned off, and a green image is displayed over the entire face of the display surface. In this state, the optical sensor 10G is allowed to detect the intensity of external light having wavelengths corresponding to green color, which is guided into the liquid crystal display panel 18 from the outside of the panel through the display surface. The results of detection by the optical sensor 10G (referred to as "second results of detection" in the ninth embodiment) are inputted to the main controller 7 through the signal processor 6. During a frame period F23, the sequence returns to normal operations of the liquid crystal display 1, and the backlight 9 is again turned on.

Moreover, during a frame period F42 after a lapse of several tens of frame periods, the backlight 9 is turned off, and a blue image is displayed over the entire face of the display surface. In this state, the optical sensor 10B is allowed to detect the intensity of external light having wavelengths corresponding to blue color, which is guided into the liquid crystal display panel 18 from the outside of the panel through the display surface. The results of detection by the optical sensor 10B (referred to as "third results of detection" in the ninth embodiment) are inputted to the main controller 7 through the signal processor 6. During a frame period F43, the sequence returns to normal operations of the liquid crystal display 1, and the backlight 9 is again turned on.

Based on the first to third results of detection, the main controller 7 carries out adjustments of the light-emitting luminance of the backlight 9 and adjustments of the contrast of the image, so as to make the display image less susceptible to variations in the luminance and hues of external light. Moreover, in the case where the backlights of three colors of 9R, 9G, 9B are adopted, the main controller 7 adjusts the balance of light-emitting luminance of backlights 9R, 9G, 9B.

Thereafter, in the same manner as described above, measurements of the respective colors of red, green and blue are carried out regularly. An interval between sets from the time at which measurements to be carried out on the three colors as one set have been once finished to the time at which the measurements of the next set is started may be changed within a range from several times to several tens of times depending on the state of data changes with respect to the results of detection. In the case where the data change is small, the interval between sets is prolonged, and in contrast, in the case where the data change is great, the interval between sets is shortened. However, the time interval between the measurements of the respective colors of red, green and blue is set to be constant.

FIG. 22 shows a schematic diagram that describes operations of a liquid crystal display according to the ninth embodiment based on the second embodiment. During frame periods F1 to F3, the backlight 9 is turned off in accordance with normal operations of the liquid crystal display 1. During a frame period F1, a red image I1 is displayed over the entire face of the display surface. In this state, the optical sensor 10R is allowed to detect the intensity of external light having wavelengths corresponding to red color, which is guided into the liquid crystal display panel 18 from the outside of the panel through the display surface. The first results of detection by the optical sensor 10R are inputted to the main controller 7. During a frame period F2, a green image I2 is displayed over the entire face of the display surface. In this state, the optical sensor 10G is allowed to detect the intensity of external light having wavelengths corresponding to green color, which is guided into the liquid crystal display panel 18 from the outside of the panel through the display surface. The second results of detection by the optical sensor 10G are inputted to the main controller 7. During a frame period F3, a blue image I3 is displayed over the entire face of the display surface. In this state, the optical sensor 10B is allowed to detect the intensity of external light having wavelengths corresponding to blue color, which is guided into the liquid crystal display panel 18 from the outside of the panel through the display surface. The third results of detection by the optical sensor 10B are inputted to the main controller 7. In the same manner as described above, based on the first to third detection results, the main controller 7 carries out adjustments of the light-emitting luminance, etc. of the backlight 9.

In accordance with the liquid crystal display of the ninth embodiment, the detection of the intensity of external light is carried out by using each of the optical sensors 10R, 10G, 10B for each of the colors of red, green and blue; therefore, it becomes possible to adjust not only the luminance of the display surface, but also hues of the displayed image.

Tenth Embodiment

In the first embodiment, the all-white image I3 to be used for adjusting the luminance of the screen is inserted between normal images I2 and I4 that are displayed in accordance with normal operations of the liquid crystal display 1, as shown in FIG. 8. However, it is more preferable to find the intensity of external light on the assumption that the all-white image is displayed, with a normal image being displayed without the insertion of the all-white image. In a tenth embodiment, a description will be given of a liquid crystal display in which, in the case where a normal image is displayed, the above-mentioned objective is achieved based on the gradation data (hereinafter, referred to as "gradation") of the image and the intensity of external light detected by an optical sensor at that time.

FIG. 23 shows a graph that indicates the relationship between gradation D and light transmittance (hereinafter, referred to as "transmittance") T in the case where a gamma correction is not carried out. Here, it is assumed that the gradation level of each pixel on the display surface is represented by a data structure of 8 bits. When the gradation level is represented by the data structure of 8 bits, the gradation of each pixel can be set to 256 stages from level 0 to level 255. Moreover, FIG. 24 shows a graph that indicates the relationship between gradation D and transmittance T in the case where a gamma correction is carried out. As shown in FIGS. 2 and 3, since the image processor 4 has the gamma correction unit 13, the following description will discuss operations of the liquid crystal display of the tenth embodiment, on the assumption that the relationship between gradation D and transmittance T is indicated by a graph in FIG. 24.

FIG. 25 shows a schematic diagram that describes operations of the liquid crystal display according to the tenth embodiment. During a frame period F3, a normal image I3 is displayed on the display surface in accordance with normal operations of the liquid crystal display 1. The main controller 7 shown in FIG. 1 has an operation unit (not shown) installed therein, and the operation unit receives image data relating to the image I3 from the image processor 4, and finds transmittance To relating to the image I3 based on the image data.

The following description will discuss a calculation method for gradation D of the image I3. FIG. 26 shows a diagram that indicates the gradation of each pixel in the case where the image I3 is displayed. For example, a pixel $S_{11}$ has a gradation $D_{11}$. As indicated by the following equation (1), by taking the coefficient γ of the gamma correction into consideration, the sum of gradations of all the pixels is divided by the number of all the pixels Z so that the gradation $D_0^r$ of the image I3 is calculated. Here, the exponent "r" refers to "γ" (hereinafter, the same is true). Then, in accordance with the relational expression shown in FIG. 24, the transmittance $T_0$ relating to the image I3 is calculated by dividing the gradation $D_0^r$ by $255^r$.

$$T_0 = \frac{D_{11}^r + D_{12}^r + D_{13}^r + \cdots D_{mn}^r}{255^r \cdot Z} \quad (1)$$

Here, the optical sensor 10 detects the intensity E of external light that has been guided into the liquid crystal display panel 18 from the outside of the panel through the display surface, with the image I3 being displayed over the entire face of the display surface. As shown in FIG. 25, during the frame period F3, the backlight 9 is turned off. The detection of the intensity E of external light may be carried out within a period in which no switching is made between displayed images, such as a back porch or a front porch. Moreover, in the case where the same image I3 is displayed also in a frame period (for example, the next frame period F4) different from the frame period F3, the detection of the intensity E of external light may be carried out within the frame period F4.

Since, in the case where the all-white image is displayed, the transmittance $T_w$ is considered to be 100%, the main controller 7 calculates the intensity $E_w$ of external light that would be detected by the optical sensor 10 on the assumption that the all-white image was displayed, by dividing the intensity E by the transmittance $T_0$, as indicated by the following equation (2).

$$E_W = \frac{E}{T_0} \quad (2)$$

Thereafter, in the same manner as the first embodiment, the main controller 7 adjusts the luminance of the display surface based on the intensity $E_w$ of external light.

As described above, in accordance with the liquid crystal display of the present invention 10, it is possible to find the intensity $E_w$ of external light on the assumption that the all-white image is displayed with a normal image being displayed without the insertion of the all-white image. Therefore, it is possible to completely eliminate the possibility of irregularities on the display surface caused by the display of the all-white image, which might be detected by the observer.

Eleventh Embodiment

With respect to the external light that has been guided into the liquid crystal display panel 18 from the outside of the panel through the display surface, the degree of easiness in detection by the optical sensor 10 is different depending on the positions within the display surface on which it is made incident. This is because the external light is susceptible to influences from the distance to the optical sensor 10 and the inner structures of the liquid crystal display panel 18 and the light-guiding plate 19. In an eleventh embodiment, upon finding the sum of gradations of all the pixels in the same manner as the tenth embodiment, a weighting process is carried out on the gradation of each pixel depending on the position of each pixel within the display surface.

Figure 28:
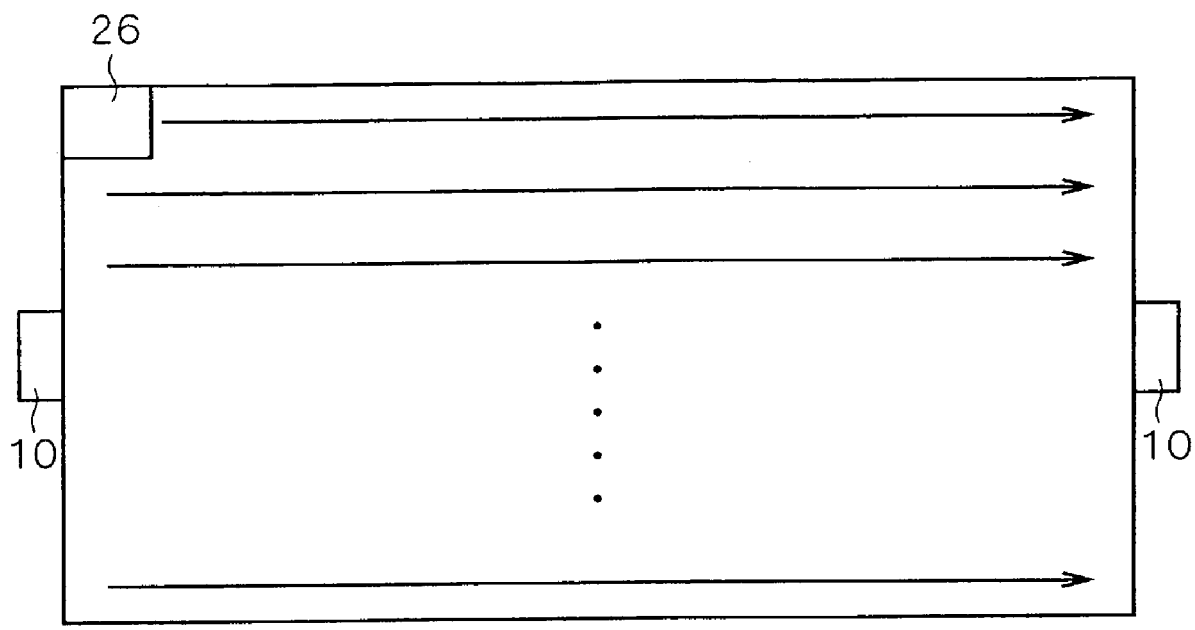
FIG. 28 is a diagram for describing a determining method for the correction coefficient.

FIG. 27 shows the correction coefficient corresponding to each pixel. For example, the correction coefficient corresponding to the pixel $S_{11}$ is represented by $K_{11}$. FIG. 28 describes a determination method for the correction coefficient. After external light having a fixed intensity has been applied to the display surface, scanning processes are carried out on all the pixels by using a white-screen window 26 having the same size as the pixel. With respect to portions other than the white-screen window 26, a black image is displayed. Then, the optical sensor 10 is allowed to detect the intensity of external light for each of the pixels. Upon completion of the detection with respect to all the pixels, the average value of detected intensities of external light is also calculated. The value, obtained by dividing the intensity of external light relating to each pixel by the average value, forms a correction coefficient K of the corresponding pixel. The correction coefficients K relating to all the pixels are stored in the storage unit 8, and upon calculating the transmittance $T_0$ relating to the image I3, the main controller 7 refers to these values.

As indicated by the following equation (3), the main controller 7 finds the sum of products between the gradation D and correction coefficient K with respect to all the pixels, by taking the coefficient γ of the gamma correction into consideration, and the resulting sum is divided by the number of all the pixels Z so that the gradation $D_0^r$ of the image I3 is calculated. Then, the transmittance $T_0$ relating to the image I3 is calculated by dividing the gradation $D_0^r$ by $255^r$.

$$T_0 = \frac{D_{11}^r \cdot K_{11} + D_{12}^r \cdot K_{12} + D_{13}^r \cdot K_{13} + \cdots + D_{mn}^r \cdot K_{mn}}{255^r \cdot Z} \quad (3)$$

Thereafter, in the same manner as the tenth embodiment, the detection of the intensity E of external light is carried out by the optical sensor 10, and the calculation of the intensity $E_w$ of external light is carried out by the main controller 7.

In this manner, in accordance with the liquid crystal display of the eleventh embodiment, a weighting process is carried out on the gradation in accordance with the position of respective pixels within the display surface by using the correction coefficient K so that the intensity $E_w$ of external light is calculated accurately by taking influences from the distance to the optical sensor 10 and the inner structure of the liquid crystal display panel 18, etc. into consideration.

Twelfth Embodiment

Figure 29:
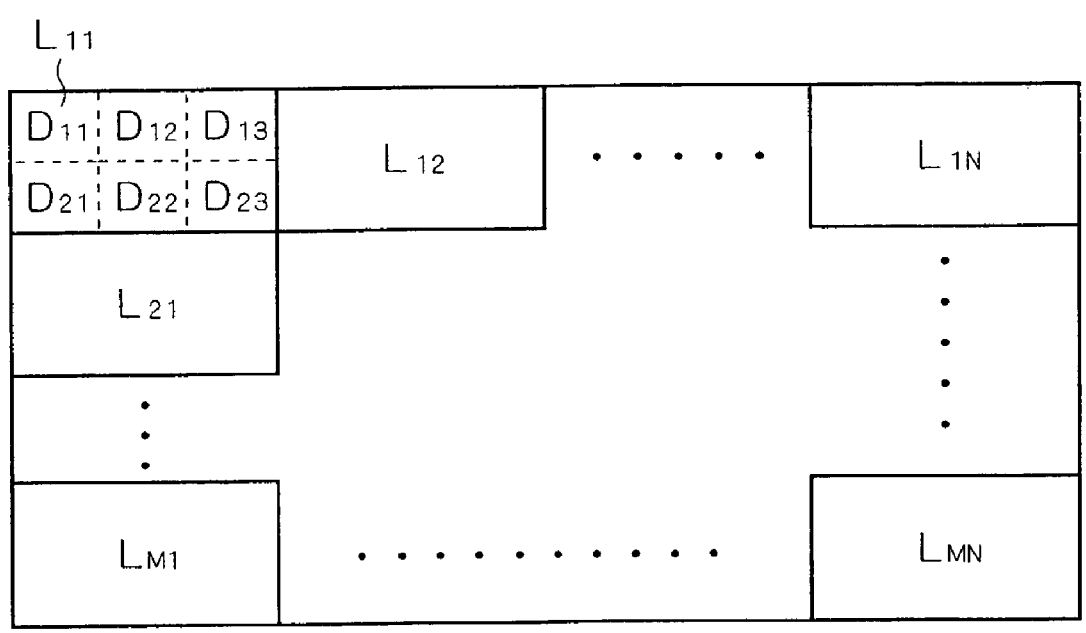
FIG. 29 is a diagram for describing a determining method for a correction according to a twelfth embodiment of the present invention.

In the case where the correction coefficient K is determined for each pixel as described in the eleventh embodiment, enormous amounts of data need to be stored in the storage unit 8. In a twelfth embodiment, a description will be given of a liquid crystal display which can reduce the required storage capacity of the storage unit 8 used for storing the correction coefficients. FIG. 29 shows a method for determining the correction coefficient according to the twelfth embodiment. The display surface is divided into a predetermined number of areas L. In general, the display surface is divided into approximately 8 to 32 division areas in the horizontal direction, and approximately 4 to 32 division areas in the vertical direction. In the example shown in FIG. 29, N-number of division areas are formed in the horizontal direction, and M-number of division areas are formed in the vertical direction. Moreover, each area L has 6 pixels.

Figure 30:
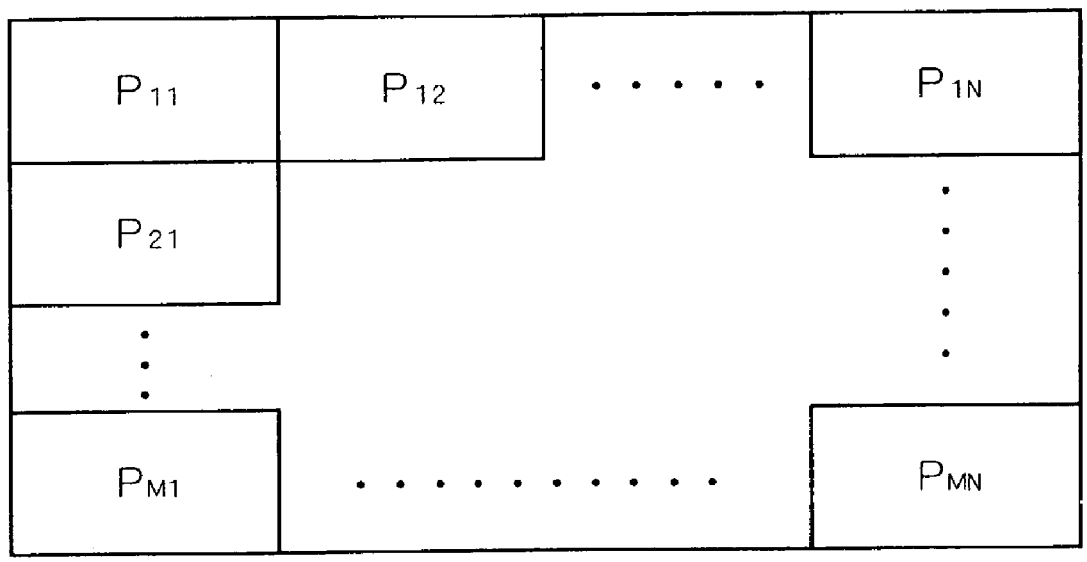
FIG. 30 illustrates the correction coefficient for each area.

In the twelfth embodiment, the correction coefficient P having the same value is used with respect to a plurality of pixels belonging to the same area L. FIG. 30 shows the correction coefficient P corresponding to each of the areas L. For example, the correction coefficient corresponding to an area $L_{11}$ is represented by $P_{11}$. The correction coefficient $P_{11}$ can be obtained as the average value of correction coefficients $K_{11}, K_{12}, K_{13}, K_{21}, K_{22}, K_{23}$, shown in FIG. 27. The correction coefficients P with respect to all the areas L are stored in the storage unit 8.

Figure 31:
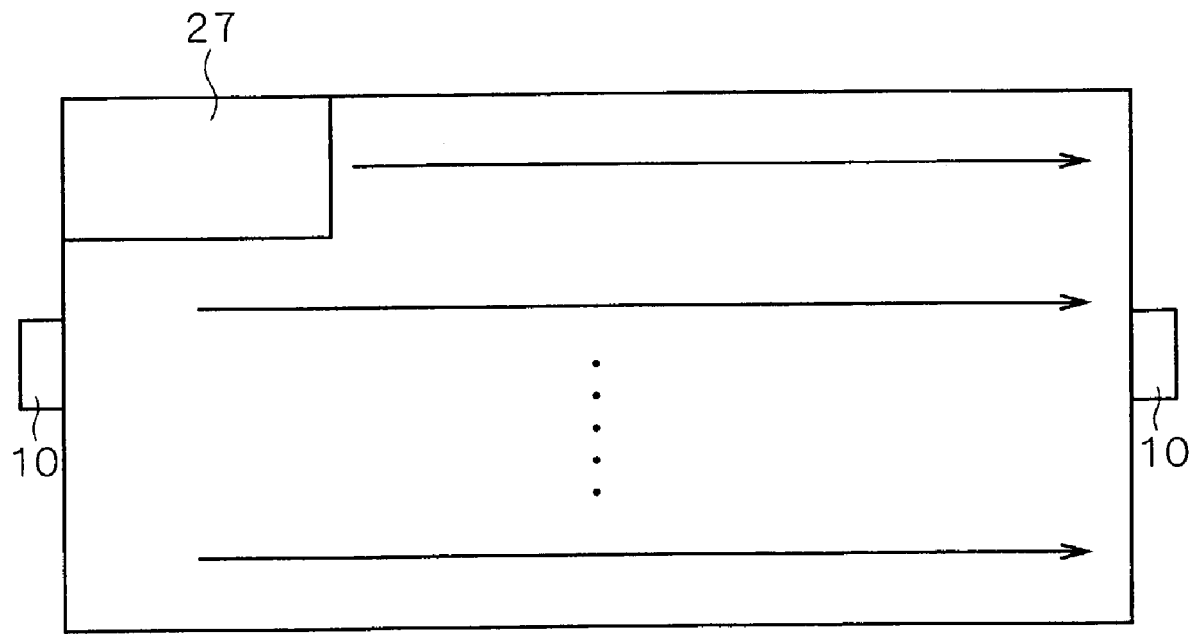
FIG. 31 is a diagram for describing a determining method of the correction coefficient.

Alternatively the correction coefficient P may be found by the following method. FIG. 31 describes a method for determining the correction coefficient P. After external light having a fixed intensity has been applied to the display surface, scanning processes are carried out on all the areas by using a white-screen window 27 having the same size as the area L. With respect to portions other than the white-screen window 27, a black image is displayed. Then, the optical sensor 10 is allowed to detect the intensity of external light for each of the areas L. Upon completion of the detection with respect to all the areas L, the average value of detected values is also calculated. The value, obtained by dividing the intensity of external light relating to each area L by the average value, forms a correction coefficient P of the corresponding area L.

Here, in the case where the values of the correction coefficients P of mutually adjacent areas L are different from each other greatly, the main controller 7 may revise the values of the correction coefficients P by using a linear interpolating process. For example, supposing that the center pixel of an area $L_{11}$ is represented by $P_{11}$, and that the center pixel of an area $L_{12}$ is represented by $P_{12}$, the correction coefficients $P_{11}$ and $P_{12}$ of the other pixels within the areas $L_{11}$ and $L_{12}$ are revised by using linear interpolations depending on the distances from the center pixels of the areas $L_{11}$ and $L_{12}$ to the respective pixels.

As indicated by the following equation (4), the main controller 7 finds the sum of products between the gradation D and correction coefficient P with respect to all the pixels, by taking the coefficient γ of the gamma correction into consideration, and the resulting sum is divided by the number of all the pixels Z so that the gradation $D_0{}^r$ of the image I3 is calculated. Then, the transmittance $T_0$ relating to the image I3 is calculated by dividing the gradation $D_0{}^r$ by $255^r$.

$$T_0 = \frac{D^r_{11} \cdot P_{11} + D^r_{12} \cdot P_{11} + D^r_{13} \cdot P_{11} + \cdots + D^r_{mn} \cdot P_{MN}}{255^r \cdot Z} \quad (4)$$

Thereafter, in the same manner as the tenth embodiment, the detection of the intensity E of external light is carried out by the optical sensor 10, and the calculation of the intensity $E_w$ of external light is carried out by the main controller 7.

In this manner, in accordance with the liquid crystal display of the twelfth embodiment, by using the same value of the correction coefficient P with respect to a plurality of pixels belonging to the same area L, it becomes possible to reduce the required storage capacity of the storage unit 8 used for storing the correction coefficients.

Thirteenth Embodiment

In the twelfth embodiment, when the liquid crystal display panel 18 is provided with color filters of three colors of red, green and blue, the correction coefficient P is prepared for each of the colors, and the calculation of the gradation $D_0{}^r$ is carried out by the main controller 7 for each of the colors, as indicated by the following equations (5) to (7).

$$T_{0R} = \frac{D^r_{11R} \cdot P_{11R} + D^r_{12R} \cdot P_{11R} + D^r_{13R} \cdot P_{11R} + \cdots + D^r_{mnR} \cdot P_{MNR}}{255^r \cdot Z} \quad (5)$$

-continued $$T_{0G} = \frac{D^r_{11G} \cdot P_{11G} + D^r_{12G} \cdot P_{11G} + D^r_{13G} \cdot P_{11G} + \cdots + D^r_{mnG} \cdot P_{MNG}}{255^r \cdot Z} \quad (6)$$

$$T_{0B} = \frac{D^r_{11B} \cdot P_{11B} + D^r_{12B} \cdot P_{11B} + D^r_{13B} \cdot P_{11B} + \cdots + D^r_{mnB} \cdot P_{MNB}}{255^r \cdot Z} \quad (7)$$

FIG. 32 shows the gradation D of each pixel S in the case where the liquid crystal panel 18 has color filters of three colors. In the example shown in FIG. 32, one area L contains six pixels S in the same manner as the twelfth embodiment.

In the case where the correction coefficient $P_R$ relating to red color is determined, scanning processes are carried out on all the areas by using a red-screen window having the same size as the area L. In the same manner, when the correction coefficients $P_G$ and $P_B$ relating to green and blue colors are determined, scanning processes are carried out on all the areas by using green-screen and blue-screen windows, each having the same size as the area L.

As described above, in accordance with a liquid crystal display according to a thirteenth embodiment, with respect to the liquid crystal display panel 18 having color filters of three colors, it is possible to improve the precision in detecting the intensity of external light while reducing the required storage capacity of the storage unit 8 for storing the correction coefficients $P_R$, $P_G$ and $P_B$.

Fourteenth Embodiment

In a fourteenth embodiment, a description will be given of an invention in which the liquid crystal display 1 described in the first embodiment is applied to a touch panel having a simple structure.

Figure 33:
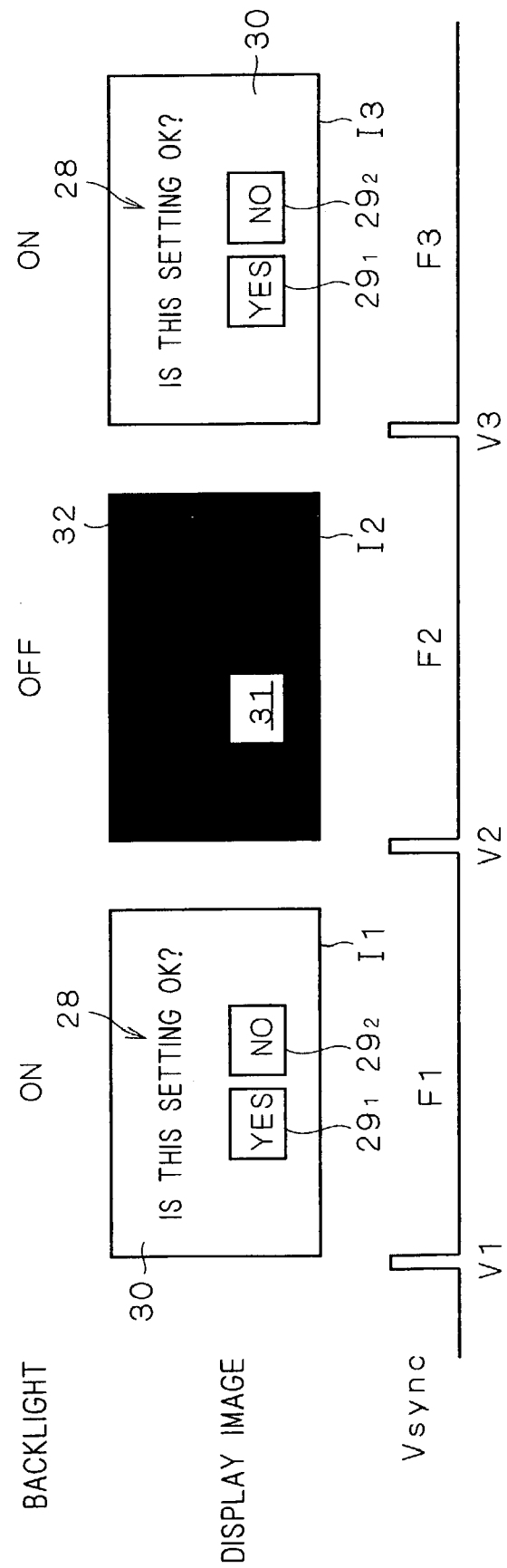
FIG. 33 is a schematic diagram for describing a first operation example of a liquid crystal display according to a fourteenth embodiment of the present invention.

FIG. 33 shows a schematic diagram that describes the first example of operations of the liquid crystal display according to the fourteenth embodiment of the present invention. FIG. 33 gives the description on the premise that a mono-color optical sensor 10 is adopted. Moreover, the panel may be used with or without a color filter.

During a frame period F1, the backlight 9 is turned on with an image I1 being displayed on the display surface. In the image I1, a predetermined message 28 is displayed, for example, in black, with a white background 30. Moreover, touch portions $29_1$ and $29_2$, which indicate "YES" and "NO" for allowing the operator to respond to the message, are displayed in a size that is virtually hidden by a human fingertip.

During a frame period F2, the backlight 9 is turned off, with an image I2 being displayed on the display surface. In the image I2, a white window 31 is displayed on a black background 32. The window 31 is displayed on the same portion with the same size as the touch portion $29_1$. In this state, the optical sensor 10 is allowed to detect the intensity of external light that has been guided into the liquid crystal display panel 18 from the outside of the panel through the window 31.

When the operator is touching the touch portion $29_1$ of "YES", external light is not guided to the liquid crystal display panel 18 through the window 31. In contrast, when the operator is touching the touch portion $29_2$ of "NO", external light is guided to the liquid crystal display panel 18 through the window 31. Therefore, based on the intensity of external light detected by the optical sensor 10, it is possible to determine which touch portion, $29_1$ or $29_2$, the operator is touching.

During a frame period F3, the backlight 9 is again turned on, and an image I3 which is the same as the image I1 is displayed on the display surface.

Figure 34:
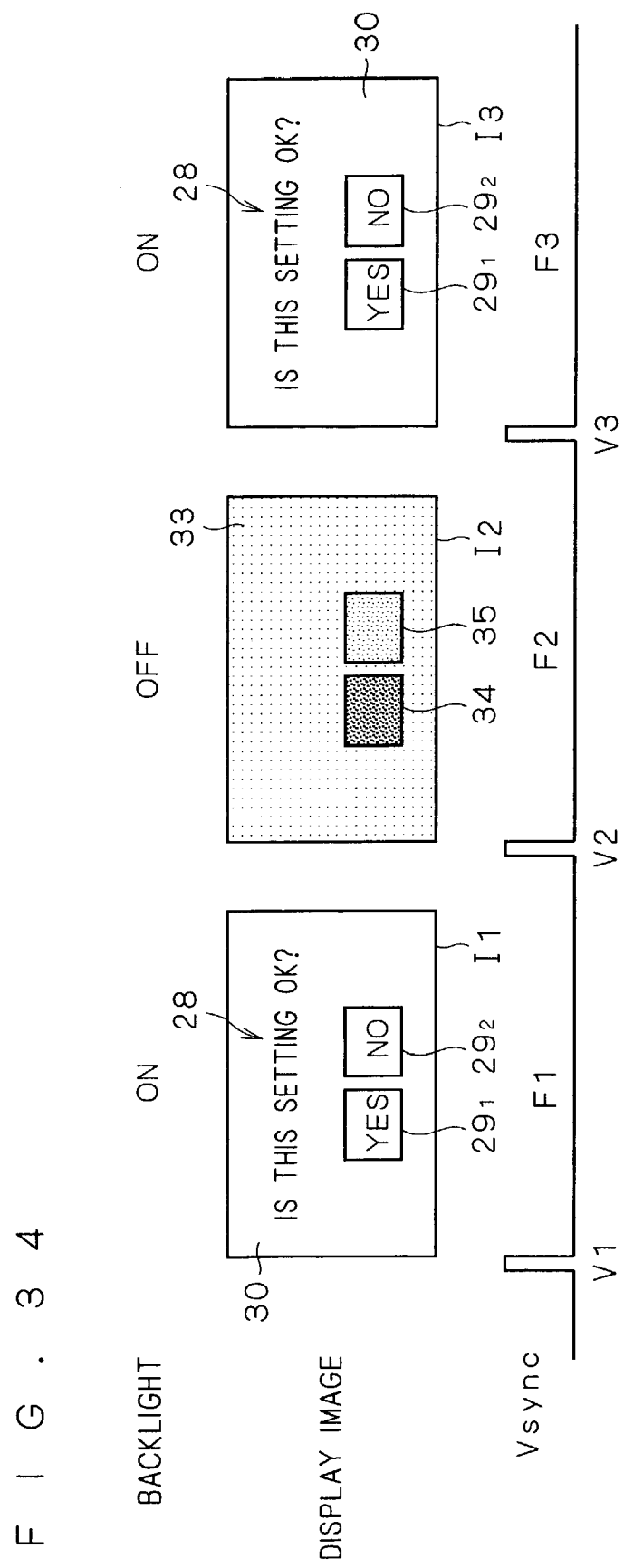
FIG. 34 is a schematic diagram for describing a second operation example of the liquid crystal display according to the fourteenth embodiment of the present invention.

FIG. 34 shows a schematic diagram that describes the second example of operations of the liquid crystal display according to the fourteenth embodiment. FIG. 34 gives the description on the premise that optical sensors of three colors 10R, 10G, 10B (more specifically, at least optical sensors 10R, 10B of two colors of red and blue) are adopted and that the liquid crystal display panel 18 has color filters of three colors.

During the frame period F1, the back light 9 is turned on, with the same image I1 as the image I1 shown in FIG. 33 being displayed on the display surface.

During the frame period F2, the backlight 9 is turned off with an image I2 being displayed on the display surface. In the image I2, a blue window 34 and a red window 35 are displayed on a green background 33. The window 34 is displayed on the same portion with the same size as the touch portion $29_1$. Moreover, the window 35 is displayed on the same portion with the same size as the touch portion $29_2$. In this state, the optical sensors 10B, 10R are allowed to detect the intensity of external light that has been guided into the liquid crystal display panel 18 from the outside of the panel through the windows 34 and 35.

When the operator is touching the touch portion $29_1$ of "YES", external light having wavelengths corresponding to blue color is not guided to the liquid crystal display panel 18 through the window 34. In contrast, external light having wavelengths corresponding to red color is guided to the liquid crystal display panel 18 through the window 35. Here, when the operator is touching the touch portion $29_2$ of "NO", external light having wavelengths corresponding to blue color is guided to the liquid crystal display panel 18 through the window 34. In contrast, external light having wavelengths corresponding to red color is not guided to the liquid crystal display panel 18 through the window 35. Therefore, based on the intensity of external light detected by the optical sensors 10B, 10R, it is possible to determine which touch portion $29_1$ or $29_2$ the operator is touching.

During a frame period F3, the backlight 9 is again turned on, and an image I3 which is the same as the image I1 is displayed on the display surface.

In FIGS. 33 and 34, the image I2 is preferably displayed to such a degree of time and frequency that the observer of the display screen would not sense the displayed state of the image I2. For example, the display time is set to 1 second divided by the frequency of the vertical synchronous signal Vsync (for example, 1/60 in the case of 60 Hz), and the frequency of the insertion is set to once in several tens seconds or not more than this frequency. With this arrangement, it is possible to avoid making the observer sense irregularities on the surface due to insertion of the image I2.

In the example shown in FIG. 33, since the white background 30 is changed to the black background 32 instantaneously, the operator may sense slight irregularities on the surface. In contrast, in the example shown in FIG. 34, since the white background 30 is changed to the green background 33, the operator is less susceptible to irregularities on the surface in comparison with the example shown in FIG. 33.

Figure 35:
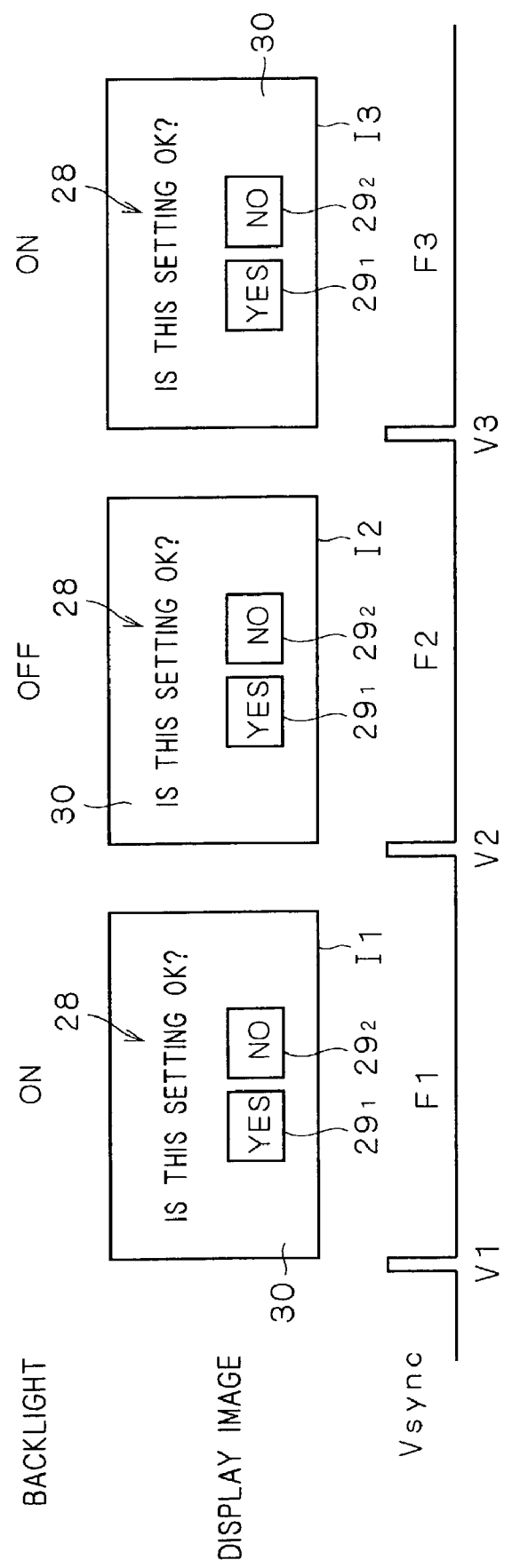
FIG. 35 is a schematic diagram for describing a third operation example the liquid crystal display according to the fourteenth embodiment of the present invention.

FIG. 35 shows a schematic diagram that describes the third example of operations of the liquid crystal display according to the fourteenth embodiment. FIG. 35 gives the description on the premise that optical sensors of three colors 10R, 10G, 10B (more specifically, at least an optical sensor 10G of green color) are adopted and that the liquid crystal display panel 18 has color filters of three colors.

During the frame period F1, the back light 9 is turned on, with an image I1 being displayed on the display surface. In the image I1, a predetermined message 28 is displayed, for example, in cyan color on a magenta background 30. Moreover, touch portions $29_1$ and $29_2$, which indicate "YES" and "NO" for allowing the operator to respond to the message 28, are displayed in a size that is virtually hidden by a human fingertip. The touch portion $29_1$ is displayed in green color, and the touch portion $29_2$ is displayed in black color.

During the frame period F2, the back light 9 is turned off, with an image I2 that is the same as the image I1 is displayed. In this state, the optical sensor 10B is allowed to detect the intensity of external light that has been guided into the liquid crystal display panel 18 from the outside of the panel through the touch portion $29_1$.

When the operator is touching the touch portion $29_1$ of "YES", external light having wavelengths corresponding to green color is not guided to the liquid crystal display panel 18 through the touch portion $29_1$. In contrast, when the operator is touching the touch portion $29_2$ of "NO", external light having wavelengths corresponding to green color is guided to the liquid crystal display panel 18 through the touch portion $29_1$. Therefore, based on the intensity of external light detected by the optical sensor 10B, it is possible to determine which touch portion $29_1$ or $29_2$ the operator is touching.

In the frame period F3, the backlight 9 is again turned on, with an image I3 that is the same as the images I1, I2 being displayed on the display surface.

In the example shown in FIG. 35, since the same images I1 to I3 are displayed on the display surface during all the frame periods F1 to F3, the operator is less susceptive to irregularities on the surface due to flickering in comparison with the examples shown in FIGS. 33 and 34.

Figure 36:
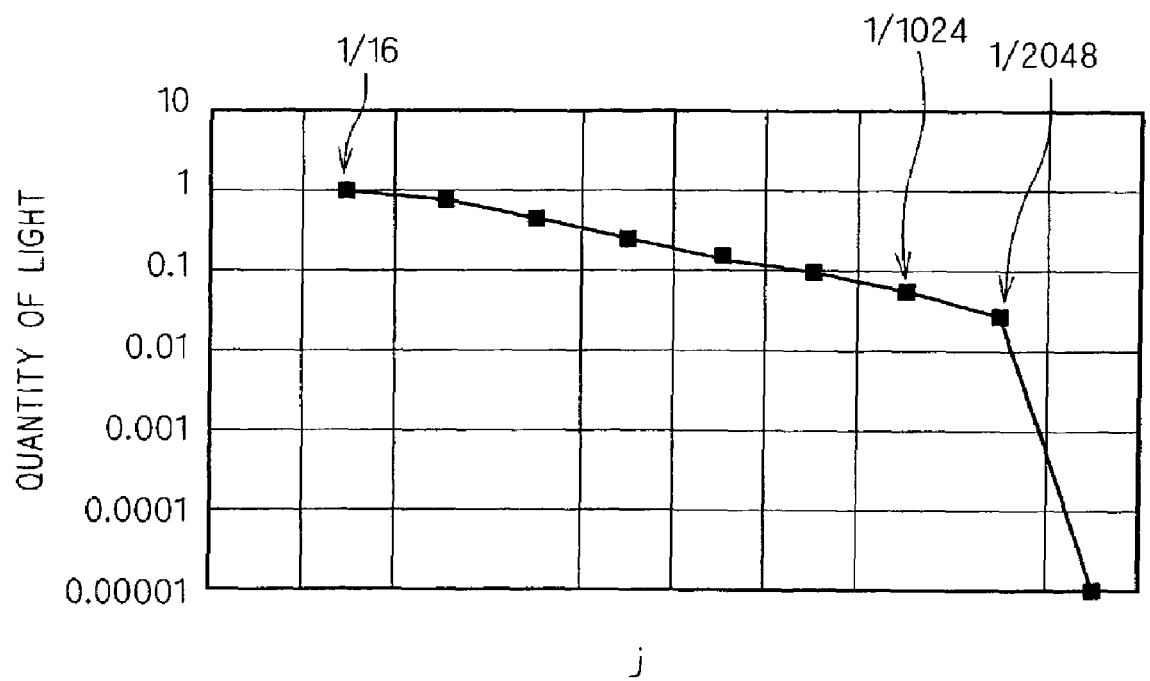
FIG. 36 is a graph showing the results of experiments.

In fact, by using a liquid crystal display panel having a size of 15 inches, experiments were conducted to compare the results of detection by the optical sensor 10 between the state where the window 31 is touched by the fingertip and the state where it is not touched by the fingertip, with a window 31 having a size of 1/j with respect to the panel size being displayed on the screen central portion. FIG. 36 is a graph that shows the results of the experiments. When the value of j is set to 1024, the window 31 has a size that is virtually hidden by the human finger tip (approximately 9×7 mm). At this time, there was a difference of not less than 10 times in the results of detection by the optical sensor 10, between the state where the window 31 is touched by the fingertip and the state where it is not touched by the fingertip. Therefore, it is confirmed that the presence or absence of the touch to the window 31 can be sufficiently determined by the optical sensor 10.

As described above, in accordance with the liquid crystal display according to the fourteenth embodiment, it is possible to obtain a touch panel with a simple structure by using the optical sensor 10 and the backlight 9.

Fifteenth Embodiment

In the example shown in FIG. 33 of the fourteenth embodiment, with respect to the image I2, in the case where the amount of external light leaking from the background portion 32 is great, even if the operator is touching the touch portion $29_2$ of "NO", the results of detection by the optical sensor 10 become greater, thereby causing the possibility of an erroneous determination. In a fifteenth embodiment, a description will be given of a liquid crystal display which can avoid such a problem.

Figure 37:
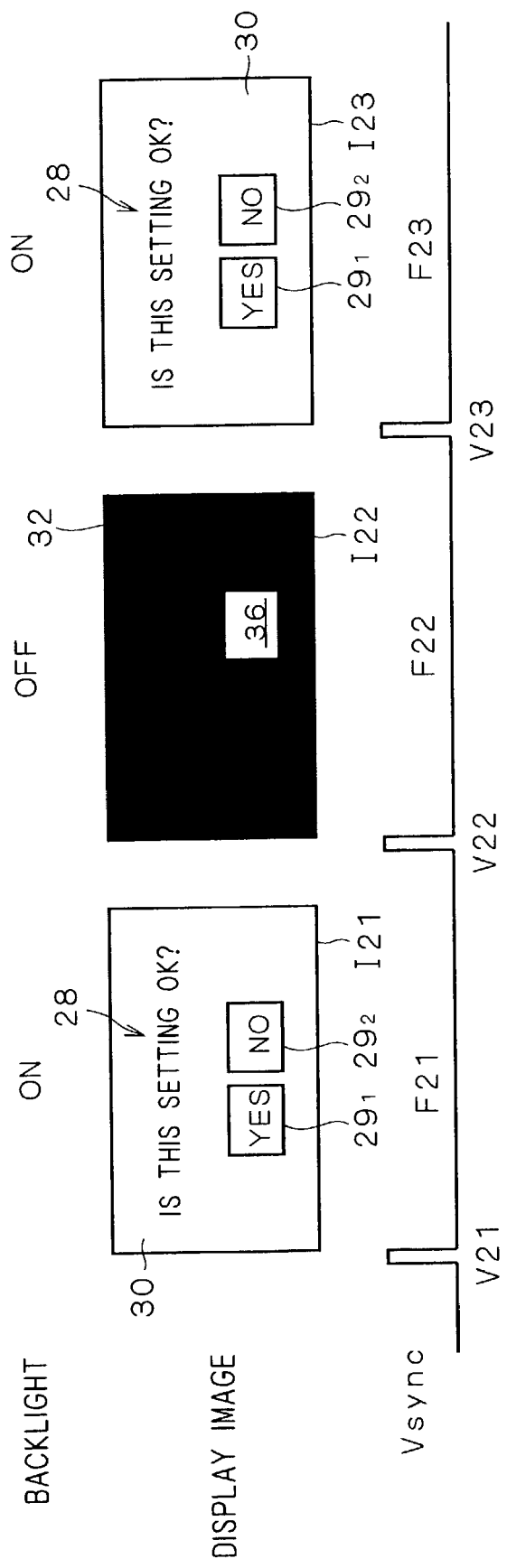
FIG. 37 is a schematic diagram for describing operations of a liquid crystal display according to a fifteenth embodiment of the present invention.

FIG. 37 shows a schematic diagram that describes operations of a liquid crystal display according to the fifteenth embodiment. During a frame period F22 after a lapse of several tens of frame periods from the frame period F2 shown in FIG. 33, the backlight 9 is turned off, and an image I22 is displayed. In the image I22, a white window 36 is displayed on a black background 32. The window 36 is displayed on the same portion with the same size as the touch portion $29_2$. In this state, the optical sensor 10 is allowed to detect the intensity of external light that has been guided into the liquid crystal panel 18 from the outside of the panel through the window 36.

When the operator is touching the touch portion $29_1$ of "YES", external light is guided into the liquid crystal display panel 18 through the window 36. In contrast, when the operator is touching the touch portion $29_2$ of "NO", external light is not guided to the liquid crystal display panel 18 through the window 36.

In the same manner as the image I2 shown in FIG. 33, the image I22, shown in FIG. 37, is preferably displayed to such a degree of time and frequency that the observer of the display screen would not sense the displayed state of the image I22. The image I2 shown in FIG. 33 and the image I22 shown in FIG. 37 are alternately displayed with intervals of several tens of frame periods.

As described above, in accordance with the liquid crystal display of the fifteenth embodiment, by comparing the results of detection by the optical sensor 10 between the state where the image I2 of FIG. 33 is displayed and the state where the image I22 of FIG. 37 is displayed, it is possible to accurately determine which touch portion, $29_1$ or $29_2$, the operator is touching.

Sixteenth Embodiment

Figure 38:
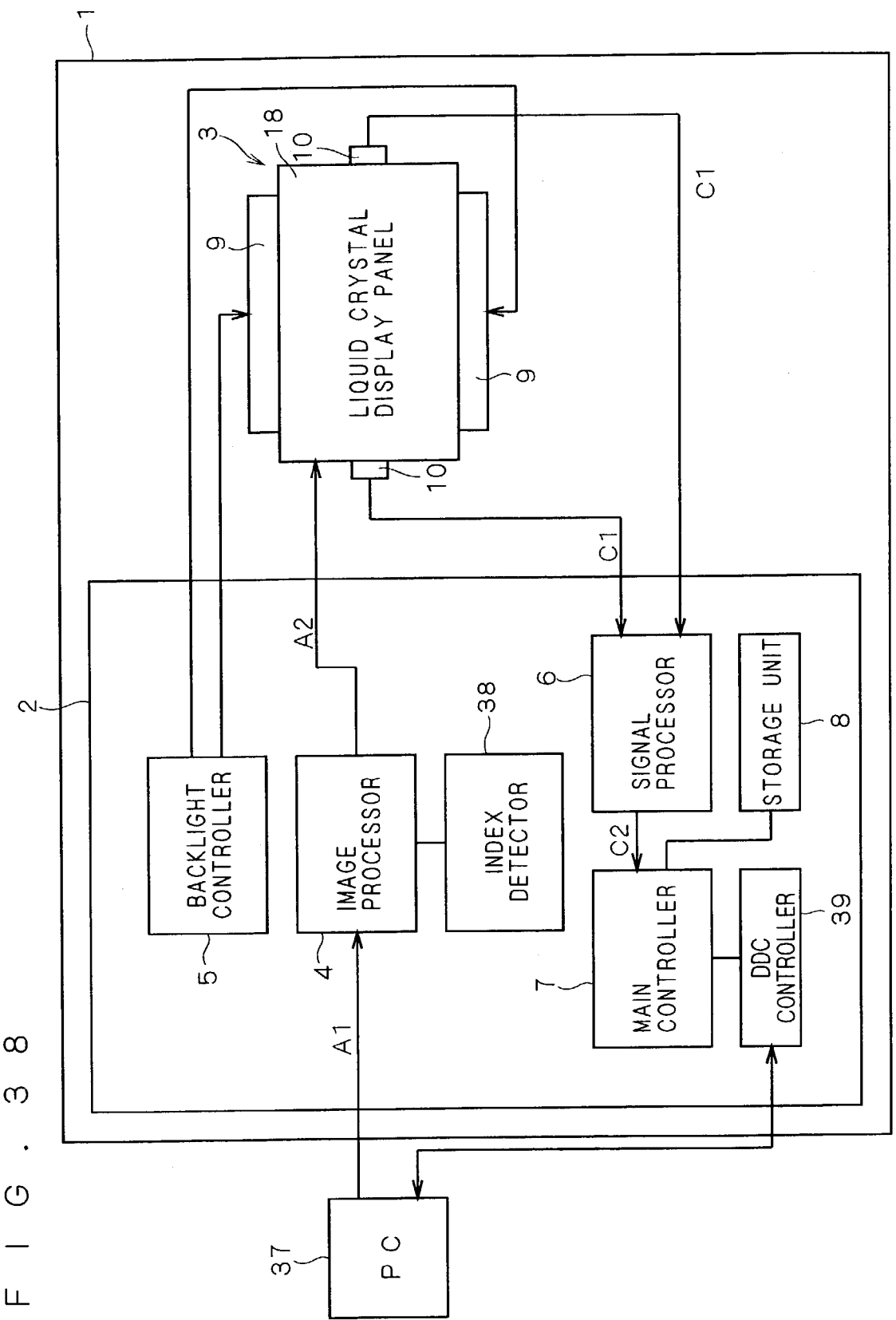
FIG. 38 is a block diagram showing a first configuration of a liquid crystal display according to a sixteenth embodiment of the present invention.

FIG. 38 is a block diagram showing a first configuration of a liquid crystal display according to a sixteenth embodiment of the present invention. The control substrate 2 is further provided with an index detector 38 and a DDC (Display Data Channel) controller 39. The liquid crystal display 1 is externally connected to a personal computer (PC) 37, and the main controller 7 transmits and receives data to and from the PC 37 through the DDC controller 39.

Figure 39:
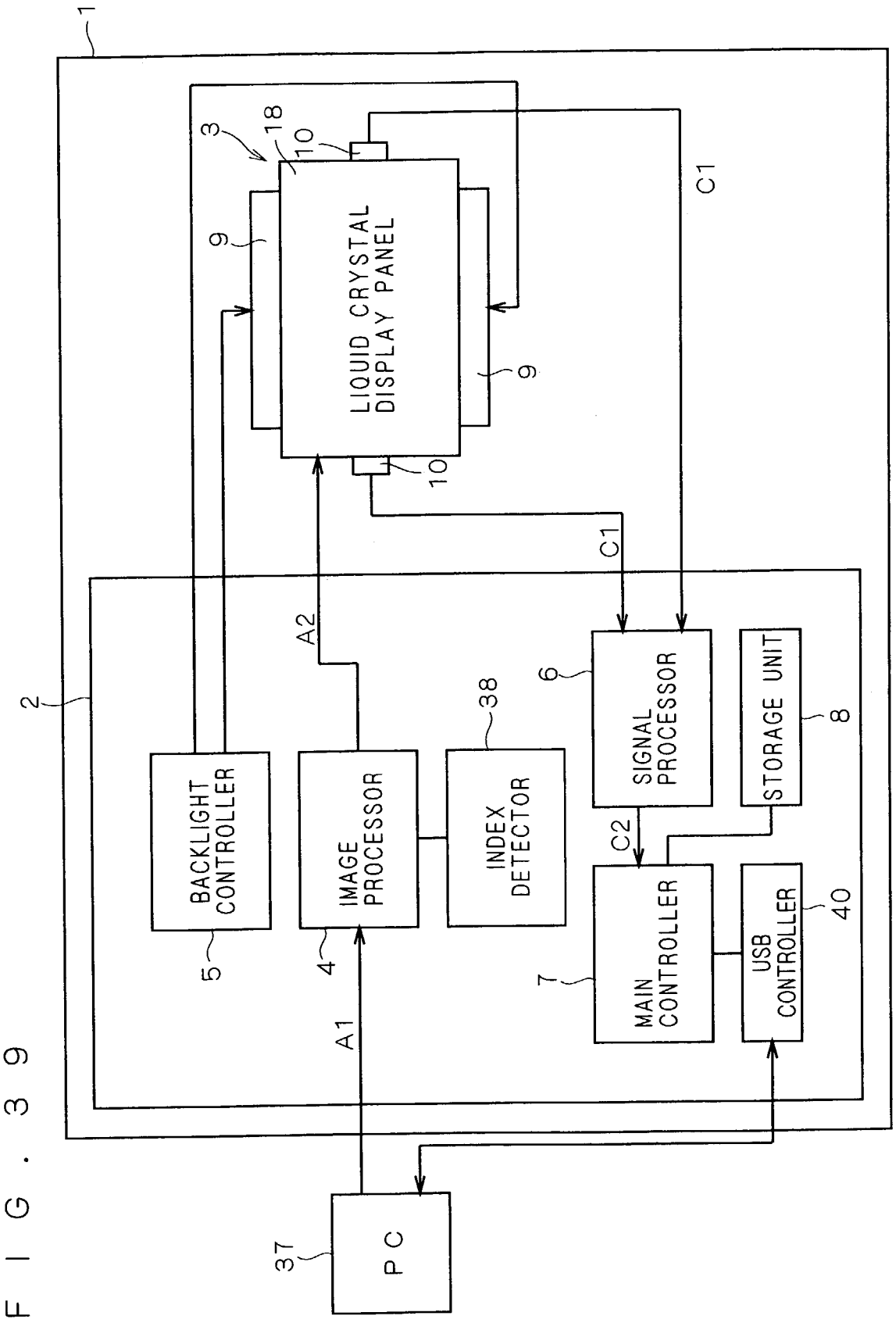
FIG. 39 is a block diagram showing a second configuration of the liquid crystal display according to the sixteenth embodiment of the present invention.

FIG. 39 shows a block diagram that indicates the second structure of a liquid crystal display according to the sixteenth embodiment of the present invention. The control substrate 2 is provided with a USB (Universal Serial Bus) controller 40 in place of the DDC controller 39 shown in FIG. 38. The main controller 7 transmits and receives data to and from the PC 37 through the USB controller 40.

As shown in FIGS. 38 and 39, an image signal A1 is inputted to the image processor 4 from the PC 37. A predetermined index signal is multiplexed on the image signal A1 by the PC 37. The index detector 38 extracts the index signal from the image signal A1. Pieces of information relating to the sizes, display positions and colors of the window 31 shown in FIG. 33, the windows 34, 35 shown in FIG. 34 and the window 36 shown in FIG. 37 as well as pieces of information relating to the colors of the backgrounds 32, 33 are respectively described in the index signal. Here, some pieces of the information may be omitted on demand. Based on the index signal extracted by the index detector 38, the image processor 4 generates the image I2 shown in FIG. 33, the image I2 shown in FIG. 34 and image I22 shown in FIG. 37.

Here, different from the arrangement in which the index signal is multiplexed on the image signal A1 and sent from the PC 37 to the liquid crystal display 1, the index signal may be sent from the PC 37 to the liquid crystal display 1 through the DDC controller 39 or the USB controller 40.

As described above, in accordance with the liquid crystal display of the sixteenth embodiment, based on the index signal sent from the PC 37, the image processor 4 makes it possible to appropriately generate the image I2 shown in FIG. 33, the image I2 shown in FIG. 34 and the image I22 shown in FIG. 37.

Seventeenth Embodiment

In a seventeenth embodiment, a description will be given of an invention which modifies the liquid crystal display 1 described in the first embodiment as a communication device having a simple structure by using the backlight 9 as a transmitter with the optical sensor 10 being used as a receiver.

Figure 40:
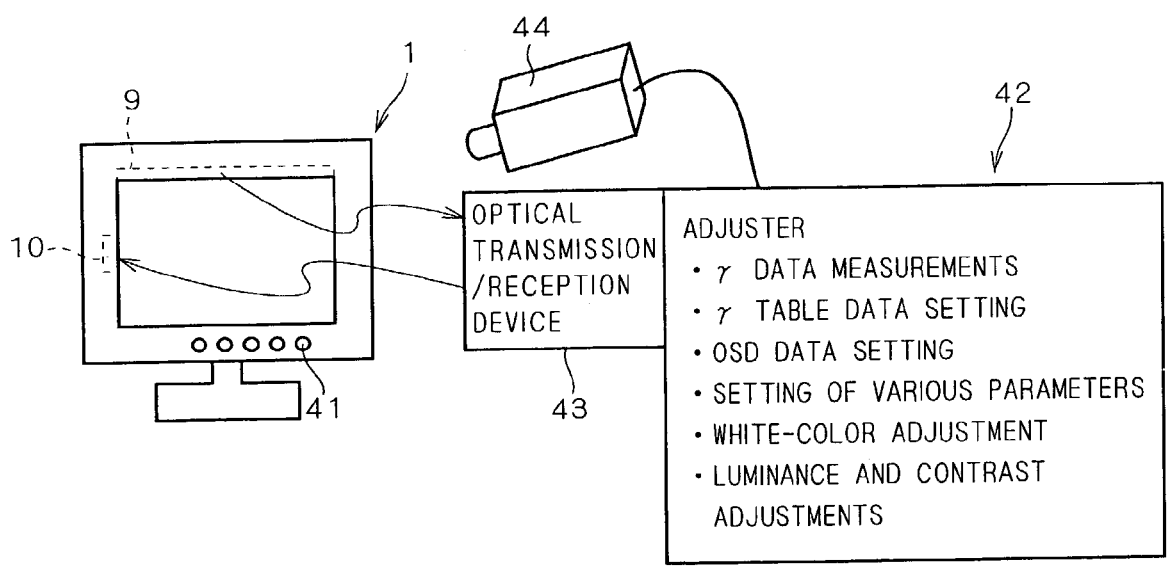
FIG. 40 is a schematic diagram showing a state where communications are executed between a liquid crystal display according to a seventeenth embodiment of the present invention and an external device.

FIG. 40 shows a schematic diagram that indicates a state where communications are carried out between a liquid crystal display according to the seventeenth embodiment of the present invention and an external device. An external adjuster 42 is provided with an optical transmission/reception device 43 and a luminance-measuring device 44. The adjuster 42 carries out various measuring, setting and adjusting processes shown in FIG. 40 in manufacturing processes of a liquid crystal display 1.

Figure 41:
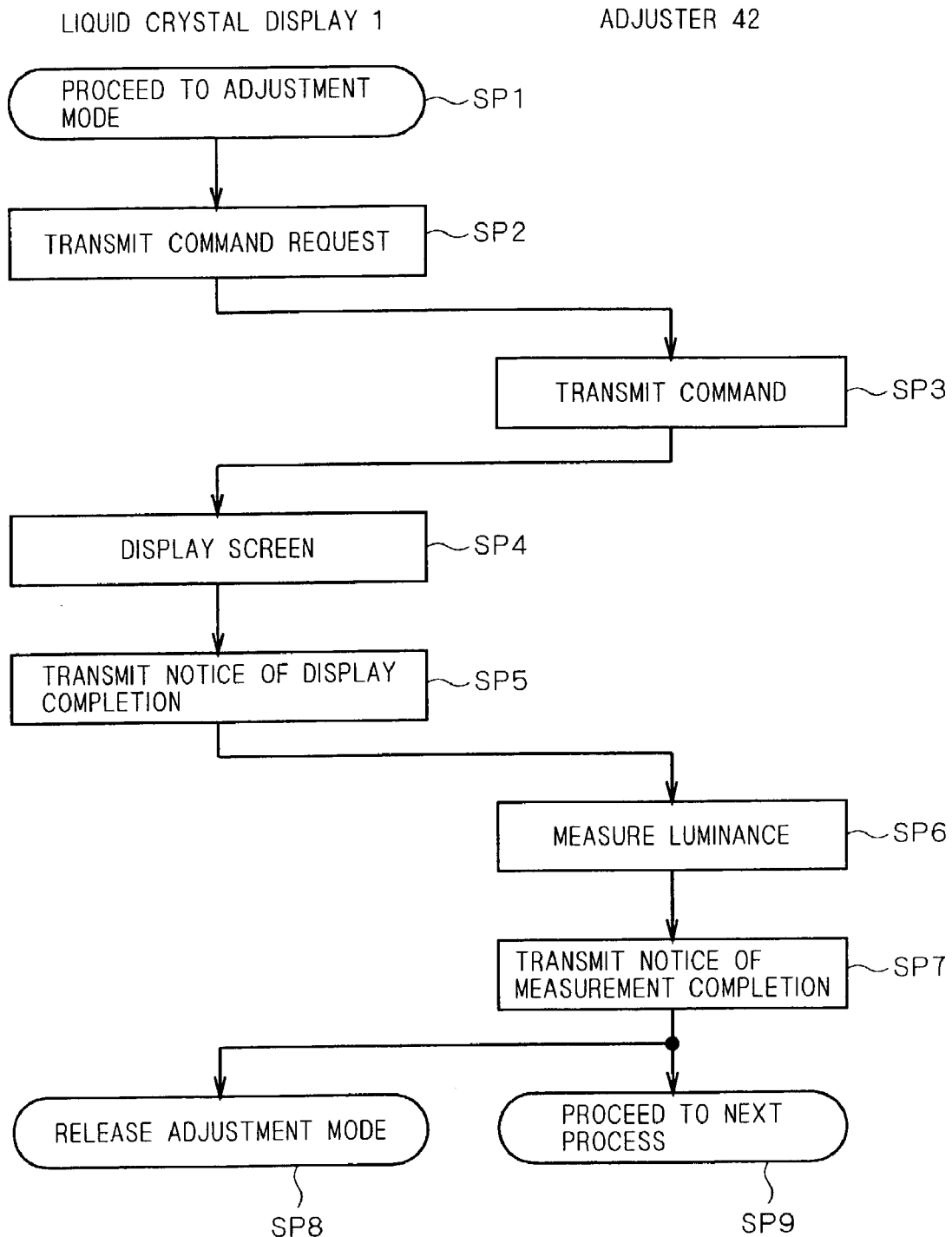
FIG. 41 is a flow chart for describing operations.

The following description will discuss bidirectional communications between the liquid crystal display 1 and the adjuster 42 based on an example of gamma data measurements. FIG. 41 shows a flow chart that describes the operations thereof. At step SP1, when the operator pushes a button 41 attached to the front face of the liquid crystal display 1, the sequence proceeds to an adjustment mode in the liquid display device 1. In the adjustment mode, the liquid crystal display 1 displays an all-white image on the display screen.

At step SP2, the liquid crystal display 1 allows the backlight 9 to flicker in a predetermined pattern so as to transmit a command request for the measurements of the gamma data to the adjuster 42 as an optical signal. The command request is received by an optical transmission/reception device 43, and transmitted to the adjuster 42.

At step SP3, the adjuster 42 transmits a predetermined command for the gamma data measurements to the liquid crystal display 1 as an optical signal through the optical transmission/reception device 43. Thus, for example, a pattern of a screen to be displayed and display time and the like of the screen are transmitted to the liquid crystal display 1 as commands. The commands are guided into the liquid crystal display panel 18 through the display surface, and received by the optical sensor 10.

At step SP4, the liquid crystal display 1 displays a predetermined screen on the display surface in accordance with the received commands.

At step SP5, the liquid crystal display 1 transmits a notice indicating the completion of a predetermined screen display as an optical signal to the adjuster 42 by allowing the backlight 9 to flicker in a predetermined pattern. This notice is received by the optical transmission/reception device 43, and then transmitted to the adjuster 42.

At step SP6, the adjuster 42 measures the luminance of the screen displayed on the display surface by using a luminance-measuring device 44.

At step SP7, the adjuster 42 transmits the notice indicating the completion of luminance measurements to the liquid crystal display 1 as an optical signal through the optical transmission/reception device 43. This notice is guided into the liquid crystal display panel 18 through the display surface, and received by the optical sensor 10. Here, after the step SP6, steps SP3 to SP6 may be executed repeatedly to display the next screen for gamma data measurements on the liquid display device 1 so as to measure the luminance thereof.

At step SP8, the adjustment mode is released in the liquid crystal display 1. Moreover, at step SP9, in the adjuster 42, the sequence proceeds to the next process for measuring the gamma data by using the luminance measured at step SP6.

Here, with respect to the optical communication system, a communication system and the like in compliance with the infrared communication standard by the IrDA (Infrared Data Association) may be used.

Moreover, with respect to data that is transmitted from an external setting device to the liquid crystal display 1 so as to set data in manufacturing lines, examples thereof include test pattern selection data used for adjusting white points and gamma data, setting parameters relating to colors and operation modes, resetting instructions for accumulated operation time and serial numbers and the like of the product.

As described above, in accordance with the liquid crystal display of the seventeenth embodiment, the backlight 9 is used as a transmitter with the optical sensor 10 being used as a receiver so that the liquid crystal display 1 itself is used as a communication device. Therefore, in an attempt to achieve communications with the external adjuster 42, no communication device other than the liquid crystal display 1 is required, thereby making it possible to simplify the system structure.

Moreover, upon setting data in the liquid crystal display 1 in manufacturing lines, since it is not necessary to connect and disconnect signal cables between the liquid crystal display 1 and the external setting device; thus, it becomes possible to shorten the working time.

Eighteenth Embodiment

Figure 42:
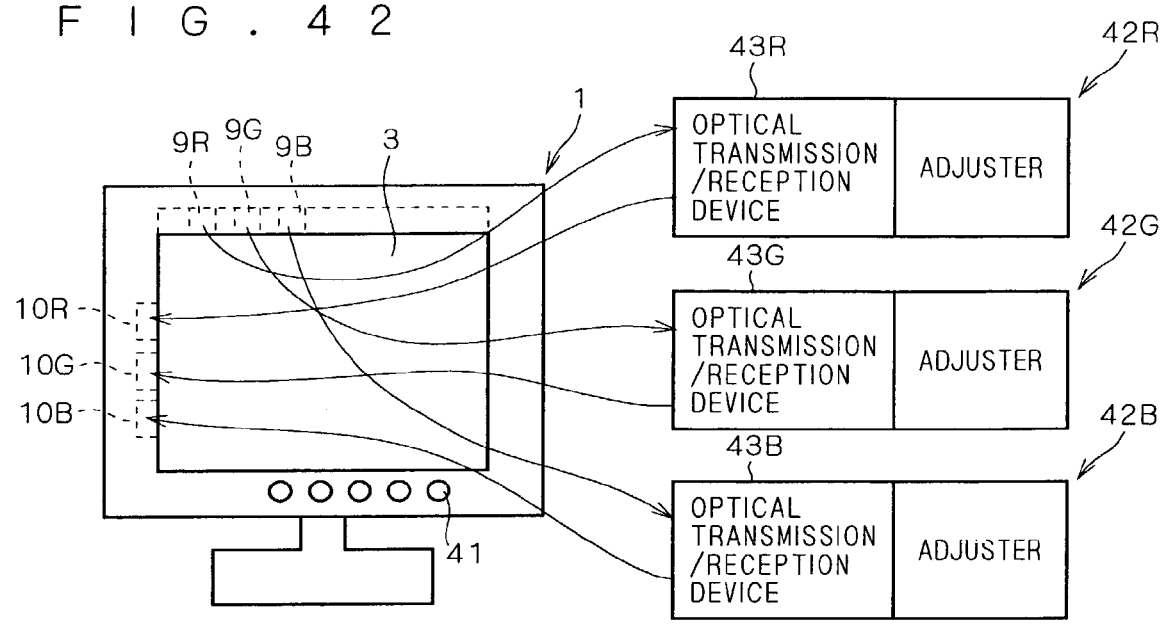
FIG. 42 is a schematic diagram showing a state where communications are executed between a liquid crystal display according to an eighteenth embodiment of the present invention and an external device.

FIG. 42 is a schematic diagram showing a state where communications are executed between the liquid crystal display according to an eighteenth embodiment of the present invention and an external device. The liquid crystal display 1 is provided with optical sensors 10R, 10G, 10B and backlights 9R, 9G, 9B. Adjusters 42R, 42G, 42B are respectively provided with optical transmission/reception devices 43R, 43G, 43B. Signals and data are transmitted and received between the optical transmission/reception device 43R and the optical sensor 10R as well as the backlight 9R by using an optical signal having wavelengths corresponding to red color. Signals and data are transmitted and received between the optical transmission/reception device 43G and the optical sensor 10G as well as the backlight 9G by using an optical signal having wavelengths corresponding to green color. Signals and data are transmitted and received between the optical transmission/reception device 43B and the optical sensor 10B as well as the backlight 9B by using an optical signal having wavelengths corresponding to blue color.

The adjusters 42R, 42G, 42B execute various measuring, setting and adjusting processes shown in FIG. 40 in parallel with each other in a shared manner.

As described above, in accordance with the liquid crystal display of the eighteenth embodiment of the present invention, the backlights 9R, 9G, 9B are used as transmitters with the optical sensors 10R, 10G, 10B being used as receivers; thus, it becomes possible to achieve a multiplex communication process by utilizing differences in light wavelengths.

Nineteenth Embodiment

Figure 43:
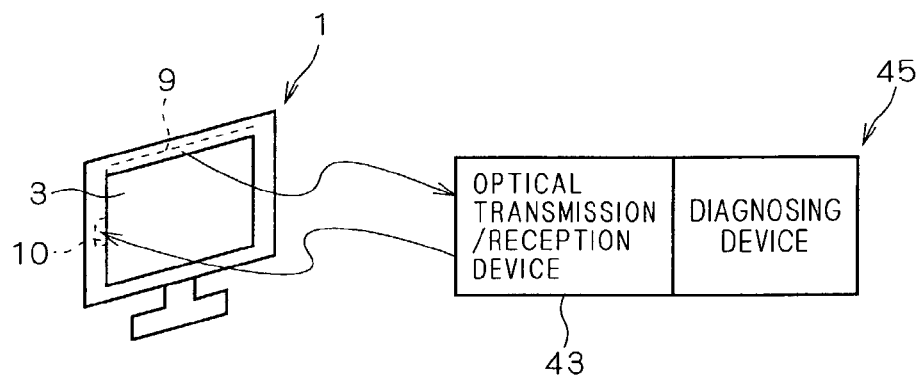
FIG. 43 is a schematic diagram showing a state where communications are executed between a liquid crystal display according to a nineteenth embodiment of the present invention and an external device.

FIG. 43 is a schematic diagram showing a state where communications are executed between the liquid crystal display according to a nineteenth embodiment of the present invention and an external device. An external diagnosing device 45 is provided with an optical receiver-transmitter 43. The diagnosing device 45 is a PC or an exclusively-used diagnosing device that is used for diagnosing a liquid crystal display 1 in which any failure is occurring.

With respect to signals and data received by the liquid crystal display 1 from the diagnosing device 45, the following information and data are listed.

Test pattern selection information and test pattern image data that are used for examining the cause of a failure.

Various parameters to be stored in a non-volatile semiconductor memory.

Various types of information that is used for indicating a portion or the like to be subjected to the self-diagnosing process, in the case where a self-diagnosing process is carried out on the liquid crystal display 1.

Moreover, with respect to signals and data transmitted to the diagnosing device 45 by the liquid crystal display 1, the following information and data are listed.

Results of the self-diagnosing process.

Accumulated operation time, model name codes, product serial numbers, reference values relating to light-emitting luminance and the like of the backlight (stored upon manufacturing) and the current light-emitting luminance of the backlight, which are stored in the non-volatile semiconductor memory.

In this manner, in accordance with the liquid crystal display of the nineteenth embodiment, the liquid crystal display 1 itself is utilized as a communication device by using the backlight 9 as a transmitter and the optical sensor 10 as a receiver. Therefore, in an attempt to achieve communications with an external diagnosing device 45, since no communication means other than the liquid crystal display 1 need to be prepared, it becomes possible to simplify the system structure.

Twentieth Embodiment

FIG. 44 is a schematic diagram showing a state where communications are executed between the liquid crystal display according to a twentieth embodiment and an external device. In the twentieth embodiment, by using a liquid crystal display 1Y having no failure is used as the optical transmission/reception device 43 shown in FIG. 43, a failure diagnosis is carried out on a liquid crystal display 1X by a diagnosing device 46. The liquid crystal display 1Y is connected to the diagnosing device 46 through the DDC controller 39 shown in FIG. 38 or through the USB controller 40 shown in FIG. 39.

The liquid crystal displays 1X, 1Y are allowed to achieve bidirectional communications by utilizing the backlights 9X, 9Y as transmitters and the optical sensors 10X, 10Y as receivers.

When a button 1X is pushed, the sequence in the liquid crystal display 1X proceeds to a failure-diagnosing mode, and the liquid crystal display 1 carries out a self-diagnosing process as to whether or not an all-white image can be displayed on the display surface 3X. An image is displayed based on image data (with all the pixels having the highest gradation) corresponding to the all-white image, with the backlight 9X being turned on, and based on the intensity of the reflected light from the display surface 3X detected by the optical sensor 10X at this time, it is confirmed whether or not the all-white image can be displayed.

When the liquid crystal display 1X is allowed to display the all-white image on the display surface 3X, the liquid crystal displays 1X, 1Y are arranged so that the display surfaces 3X, 3Y are aligned face to face with each other. Then, with the all-white image being displayed on each of the display surfaces 3X, 3Y, signals and data used for failure diagnosing are exchanged in a bidirectional manner by using the backlights 9X, 9Y as transmitters while using the optical sensors 10X, 10Y as receivers. The optical sensor 10Y is also allowed to measure the luminance of the display surface 3X. The results of diagnosis are recorded by the diagnosing device 46. Alternatively, by connecting the diagnosing device 46 to the network, the results of diagnosis relating to the liquid crystal display 1 may be transmitted to another diagnosing device connected to the network.

In contrast, in the case where the liquid crystal display 1X cannot display the all-white image on the display surface 3X, the following processes are carried out. In the case where the panel is in a normally white state (in a state where the display surface becomes a transmitting mode upon cutting off the power of the panel), the power to be supplied to the panel is cut off by the main controller 7 shown in FIG. 1. Thus, the displayed state of the all-white image is formed on the display surface 3X so that it becomes possible to carry out communications with the liquid crystal display 1Y.

Figure 45:
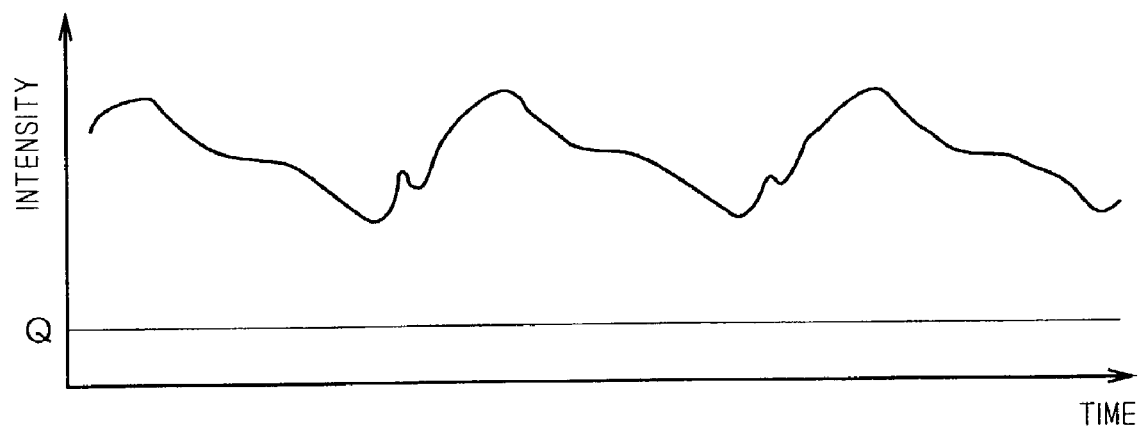
FIG. 45 is a graph showing the intensity of light detected by an optical sensor when the luminance on the display surface is approximately 10 lux.

FIG. 45 shows a graph that indicates the intensity of light detected by the optical sensor 10Y when the luminance of the display surface 3X is set to approximately 10 lux. The light-shielding line Q indicates the intensity of light detected by the optical sensor 10Y when all the surface of the display surface 3X is covered with a lid for shielding light. This shows the fact that light emitted from the backlight 9X is sufficiently detected by the optical sensor 10Y.

In the case where the panel is in a normally black state (in a state where the display surface becomes a non-transmitting mode upon cutting off the power of the panel), the liquid crystal displays 1X, 1Y are aligned face to face with each other with the display surfaces 3X, 3Y being made as close as possible to each other. The all-white image is displayed on the display surface 3Y.

Figure 46:
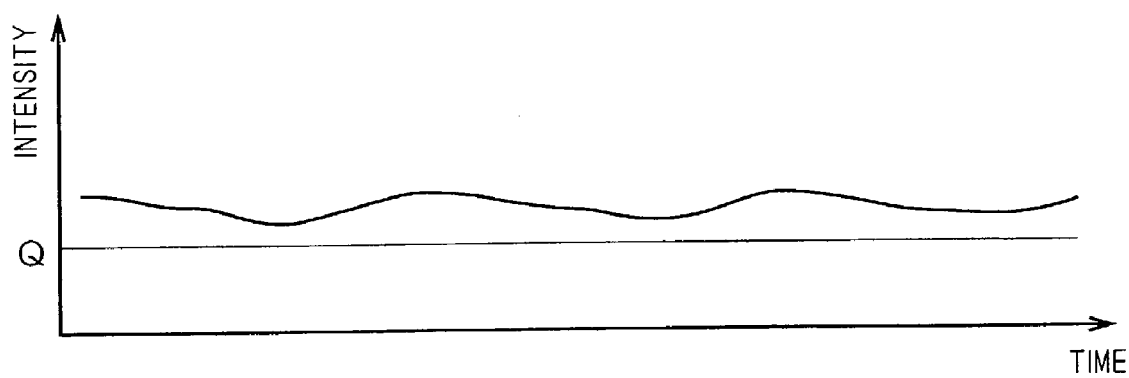
FIG. 46 is a graph showing the intensity of light detected by an optical sensor when a backlight is turned on in the state where the panel of the liquid crystal display is set in a normally black state.

FIG. 46 shows a graph that indicates the intensity of light to be detected by the optical sensor 10Y when the backlight 9X is turned on, with the panel of the liquid crystal display 1X being set to the normally black state. The difference between the detected waveform and the light-shielding line Q represents the intensity of light leaking from the display surface 3X. In general, since the screen luminance of the liquid crystal display exceeds 150 cd/cm$^2$, the intensity of light leaking from the display surface 3X is sufficiently high. The liquid crystal display 1X executes communications with the liquid crystal display 1Y by utilizing light leaking from the display surface 3X.

As described above, in accordance with the liquid crystal display of the twentieth embodiment, by utilizing the liquid crystal display 1Y having no failure as the optical transmission/reception device 43 shown in FIG. 43, it becomes possible to carry out a failure diagnosis on the liquid crystal display 1X without using any special optical transmission/reception device 43.

Twenty-First Embodiment

Figure 47:
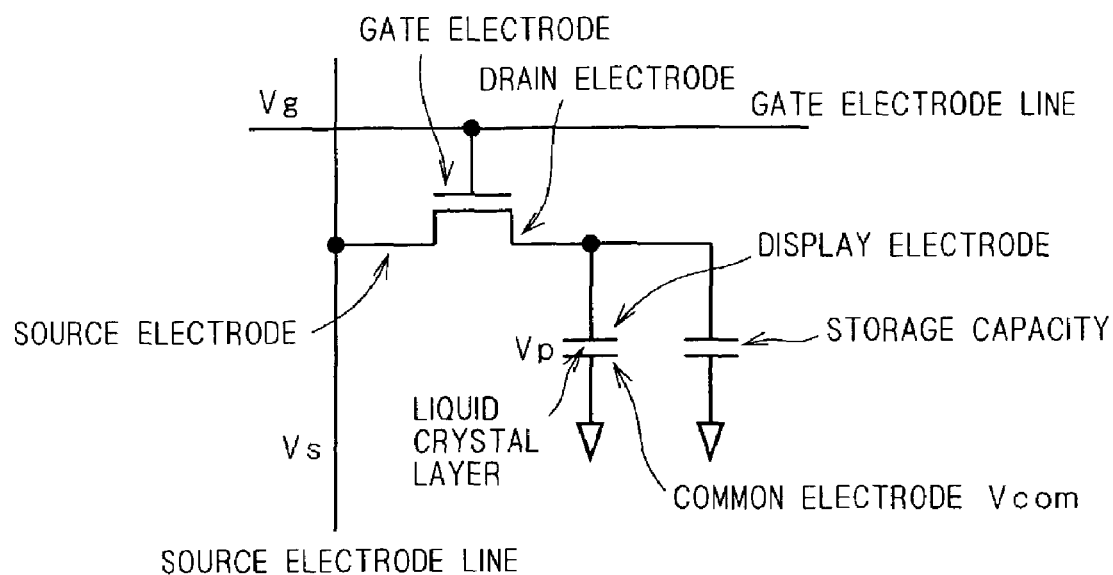
FIG. 47 is an equivalent circuit diagram of a pixel in a liquid crystal display.
Figure 48:
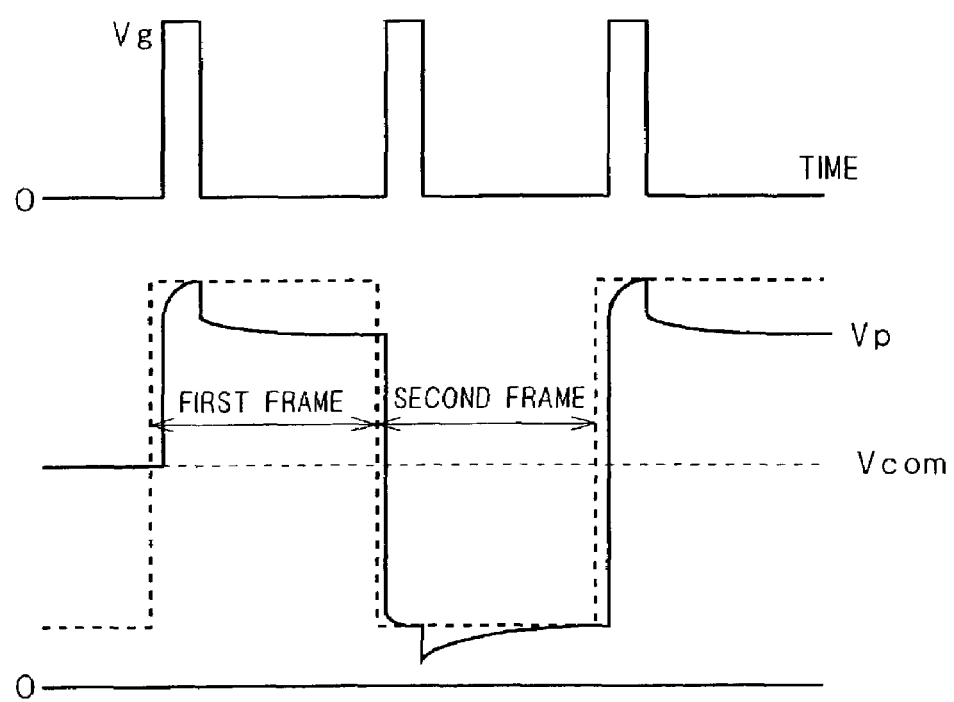
FIG. 48 illustrates variations in the voltage during frame-inversion driving.

FIG. 47 shows an equivalent circuit diagram of a pixel in the liquid crystal display, and FIG. 48 illustrates variations in the voltage during frame-inverting driving. As shown in FIG. 48, the voltage Vp of the display electrode is inversion-driven centered on the voltage (common voltage) Vcom of the common electrode. In the case where there is a deviation in the voltage value of the common voltage Vcom, since a difference appears in the screen luminance between two consecutive frame periods, flickers are generated. Therefore, the twenty-first embodiment will describes a method for appropriately setting the common voltage Vcom in the liquid crystal display 1.

Figure 49:
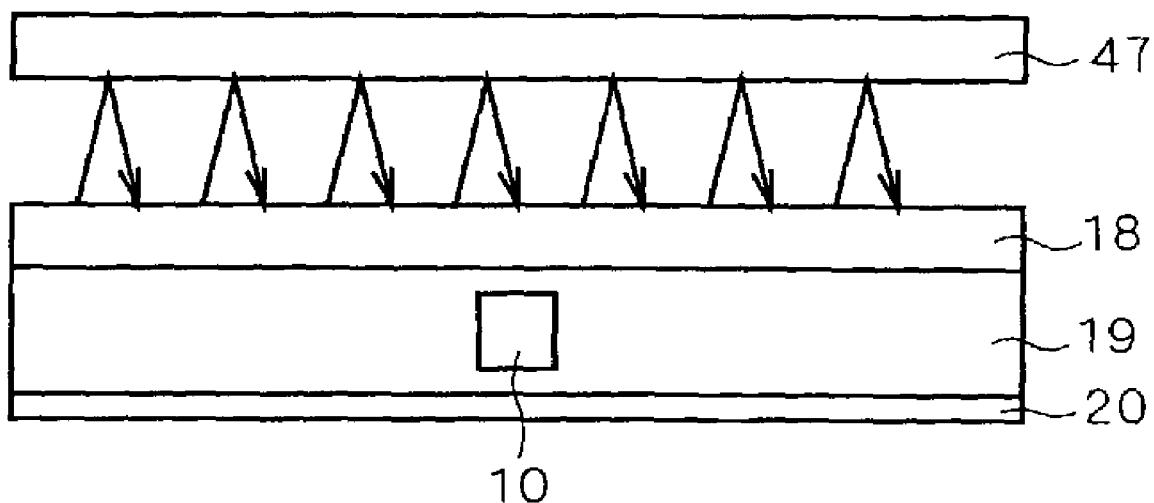
FIG. 49 is a side-view for describing a common voltage setting method according to a twenty-first embodiment of the present invention.

FIG. 49 shows a side view that describes a common voltage setting method according to the twenty-first embodiment. First, a mirror 47 is placed in parallel with the display surface of the liquid crystal display panel 18 in a manner so as to face therewith. Next, the backlight 9 is turned on, and the display electrode is inversion-driven with a predetermined image being displayed on the display surface. With respect to the predetermined image, it is preferable to use an image having an intermediate gradation (128-th gradation in the case of 256 gradations) in order to make flickers conspicuous. Light, reflected from the display surface, is reflected by the mirror 47, and again guided into the liquid crystal display panel 18 through the display surface 47. The optical sensor 10 is allowed to detect the intensity of light guided into the liquid crystal display panel 18. The common voltage Vcom is set so as to minimize the difference between the detected values of the optical sensor 10 between the two consecutive frame periods.

In accordance with the common voltage setting method of the twenty-first embodiment, it becomes possible to appropriately set the common voltage Vcom through a very simple structure and method.

While the invention has been shown and described in detail, the foregoing description is in all aspects illustrative and not restrictive. It is therefore understood that numerous modifications and variations can be devised without departing from the scope of the invention.

What is claimed is:

1. A transmissive liquid crystal display comprising:
a transmissive liquid crystal display panel having a display surface;
an optical sensor placed on the rear face of said display surface; and
a backlight for illuminating said display surface,
wherein
in a first state of the transmissive liquid crystal display panel where a first image having the greatest light transmittance in liquid crystal is displayed on said display surface with said backlight being turned off, said optical sensor detects light that has been directed from the outside of said panel through said display surface,
each image to be sensed by an observer of the display surface is illuminated by the backlight at a luminance adjusted based on the detection by the optical sensor in the first state, and
said first state is set to occur in such a manner to avoid the observer sensing the first image.

2. The liquid crystal display according to claim 1, wherein in said first state, said first image is displayed over the entire surface of said display surface,
said optical sensor detects the intensity of external light on the periphery of said display surface, and
based on the results of detection by said optical sensor, said display surface is adjusted in the luminance thereof.

3. The liquid crystal display according to claim 2, wherein said optical sensor has a plurality of optical sensors that have mutually different ranges of light wavelengths to be detected,
said liquid crystal display panel has a plurality of color filters that have mutually different ranges of light wavelengths to transmit, and the detection of said intensity of said external light by said optical sensor is carried out for each of colors.

4. The liquid crystal display according to claim 2, wherein in a second state where a second image having the smallest light transmittance in liquid crystal is displayed on the entire face of said display surface with said backlight being turned on, said optical sensor further detects light that has been emitted from said backlight.

5. The liquid crystal display according to claim 4, wherein in a third state where said second image is displayed on the entire face of said display surface with said backlight being turned off, said optical sensor further detects said external light leaking from said display surface, and
based on the results of detection by said optical sensor in said second state and the results of detection by said optical sensor in said third state, light-emitting luminance of said backlight is calculated.

6. The liquid crystal display according to claim 2, wherein said transmissive liquid crystal display panel alternates between said first state and a state in which the backlight is turned on in such a manner that the degree of lime and frequency at which said first image is displayed prevents said observer from sensing the displayed state of said first image.

7. The liquid crystal display according to claim 2, wherein said first image is displayed during a period in which no image is displayed on said display surface in normal operations of said liquid crystal display.

8. The liquid crystal display according to claim 1, wherein in said first state, a first partial image corresponding to said first image is displayed on a first portion of said display surface, a second partial image having the smallest transmittance in the liquid crystal is displayed on a second portion corresponding to a portion of said display surface on which said first partial image is not displayed, and
said optical sensor detects light that has been directed from the outside of said panel through said first portion.

9. The liquid crystal display according to claim 8, wherein one image corresponding to said first partial image displayed on a first part of said display surface and another image corresponding to said first partial image displayed on a second part of said display surface are displayed on said display surface during respectively different frame periods.

10. The liquid crystal display according to claim 8, which receives an image signal on which an index for specifying at least one member selected from the group consisting of the size, display position and color of said first partial image is multiplexed from the outside of the device, and displays said first partial image based on said index.

11. The liquid crystal display according to claim 1, wherein said optical sensor has at least first and second optical sensors having mutually different ranges of light wavelengths to be detected,
said liquid crystal display panel has a plurality of color filters that have mutually different ranges of light wavelengths to transmit,
in said first state, a first partial image corresponding to said first image is displayed on a first portion of said display surface in a first color, and also displayed on a second portion of said display surface in a second color, while a second partial image is displayed in a third color on a third portion of said display surface in which said first partial image is not displayed, said first optical sensor detects light having wavelengths corresponding to said first color which has been directed from the outside of said panel through said first portion, and
said second optical sensor detects light having wavelengths corresponding to said second color which has been directed from the outside of said panel through said second portion.

12. The liquid crystal display according to claim 11, which receives an image signal on which an index for specifying at least one member selected from the group consisting of the size, display position and color of the first partial image is multiplexed, from the outside of the device, and displays said first partial image based on said index.

13. The liquid crystal display according to claim 1, wherein in said first state, said first image is displayed over the entire face of said display surface,
in said first state, said optical sensor detects a first optical signal directed from a external device having an optical transmission/reception device through said display surface, and
in said first state, a second optical signal released from said backlight is received by said external device through said display surface.

14. The liquid crystal display according to claim 13, wherein
said optical sensor has a plurality of optical sensors having mutually different ranges of light wavelengths to be detected, and
said backlight has a plurality of backlights having mutually different light-emitting colors.

15. The liquid crystal display according to claim 1, further comprising:
a light-guiding plate for guiding light emitted from said backlight to said display surface, wherein
said optical sensor is attached to said light-guiding plate.

16. A liquid crystal display comprising:
a liquid crystal display panel having a display surface on which a plurality of pixels are arranged;
an optical sensor placed on the rear face of said display surface;
a backlight for illuminating said display surface; and
an operation unit for executing predetermined calculations, wherein
in a state where a desired image is displayed on said display surface while said backlight is turned off, said optical sensor detects the intensity of external light that has been directed from the outside of said panel through said display surface,
based on gradation data of said desired image and said intensity of said external light detected by said optical sensor, said operation unit calculates an adjusted intensity of said external light that would be directed from the outside of said panel through said display surface and detected by said optical sensor, on the assumption tat an image which makes the light transmittance of liquid crystal greatest was displayed on the entire face of said display surface with the backlight being turned off, and
based on said adjusted intensity of said external light calculated by said operation unit, the luminance of said display surface is adjusted.

17. The liquid crystal display according to claim 16, further comprising:
a light-guiding plate for guiding light emitted from said backlight to said display surface, wherein
said optical sensor is attached to said light-guiding plate.

18. A liquid crystal display comprising:
a liquid crystal display panel having a display surface on which a plurality of pixels are arranged;
an optical sensor placed on the rear face of said display surface;
a backlight for illuminating said display surface; and
an operation unit for executing predetermined calculations, wherein
in a state where a desired image is displayed on said display surface while said backlight is turned off, said optical sensor detects the intensity of first external light that has been directed from the outside of said panel through said display surface,
based on gradation data of said desired image and said intensity of said first external light detected by said optical sensor, said operation unit calculates the intensity of second external light that would be directed from the outside of said panel through said display surface and detected by said optical sensor, on the assumption that an image which makes the light transmittance of liquid crystal greatest was displayed on the entire face of said display surface with the backlight being turned off, and
based on said intensity of said second external light calculated by said operation unit, the luminance of said display surface is adjusted, wherein
said operation unit calculates said gradation data of said desired image by dividing the sum of all the gradation data of said pixels in the case where said desired image is displayed on said display surface by the number of all the pixels, and
upon finding said sum, said operation unit multiplies each gradation data of said pixels by a correction coefficient determined depending on positions of the respective pixels within said display surface.

19. The liquid crystal display according to claim 18, wherein
said display surface is divided into a predetermined number of areas, and
with respect to a plurality of pixels belonging to the same area, said correction coefficient having the same value is used.

20. The liquid crystal display according to claim 19, wherein
said predetermined number of areas include first and second areas that are adjacent to each other, and
in the case where the value of a first correction coefficient relating to said first area is greatly different from the value of a second correction coefficient relating to said second area, said calculation unit revises values of said first and second correction coefficients through a linear interpolation process.

* * * * *